US012600092B2

(12) United States Patent
von Burg et al.

(10) Patent No.: US 12,600,092 B2
(45) Date of Patent: Apr. 14, 2026

(54) RAW MATERIAL POSITIONING UNIT FOR AN ADDITIVE MANUFACTURING DEVICE AND METHOD FOR RAW MATERIAL SUPPLY

(71) Applicant: GREENBATT TECHNOLOGY HOLDING AG, Baar (CH)

(72) Inventors: Christian von Burg, Windisch (CH); Dominik Solenicki, Brugg (CH)

(73) Assignee: GREENBATT TECHNOLOGY HOLDING AG, Baar (CH)

( * ) Notice: Subject to any disclaimer, the term of this patent is extended or adjusted under 35 U.S.C. 154(b) by 194 days.

(21) Appl. No.: 18/565,476

(22) PCT Filed: Jul. 11, 2022

(86) PCT No.: PCT/EP2022/069361
§ 371 (c)(1),
(2) Date: Nov. 29, 2023

(87) PCT Pub. No.: WO2023/285404
PCT Pub. Date: Jan. 19, 2023

(65) Prior Publication Data
US 2024/0253307 A1 Aug. 1, 2024

(30) Foreign Application Priority Data

Jul. 12, 2021 (EP) ..................................... 21185131
Jul. 12, 2021 (EP) ..................................... 21185132

(51) Int. Cl.
B29C 64/321 (2017.01)
B29C 64/214 (2017.01)
(Continued)

(52) U.S. Cl.
CPC .......... B29C 64/321 (2017.08); B29C 64/214 (2017.08); B29C 64/218 (2017.08);
(Continued)

(58) Field of Classification Search
CPC ... B29C 64/321; B29C 64/153; B29C 64/214; B29C 64/218; B29C 64/236; B33Y 10/00; B33Y 30/00
See application file for complete search history.

(56) References Cited

U.S. PATENT DOCUMENTS

2019/0118466 A1 4/2019 Braunroth

FOREIGN PATENT DOCUMENTS

DE 102016218491 A1 * 3/2018 .............. B22F 10/28
EP 3310556 A1 4/2018
(Continued)

OTHER PUBLICATIONS

International Search Report and Written Opinion issued for International Application No. PCT/EP2022/069361 on Sep. 26, 2022, 12 pages.

*Primary Examiner* — JaMel M Nelson
(74) *Attorney, Agent, or Firm* — Hard IP Professional Services LLC

(57) ABSTRACT

An additive manufacturing device for manufacturing a solid article comprises raw material positioning unit, wherein the raw material positioning unit comprises a raw material distribution unit, a guide unit and a drive unit. The drive unit is configured to move the raw material distribution unit with respect to the guide unit. The raw material positioning unit comprises a switch for directing the raw material distribution unit alternatively onto a first path or a second path. The invention also includes a method for supplying a flowable raw material to a raw material processing unit of the additive manufacturing device.

20 Claims, 15 Drawing Sheets

(51) Int. Cl.

| | |
|---|---|
| *B29C 64/218* | (2017.01) |
| *B29C 64/236* | (2017.01) |
| *B33Y 10/00* | (2015.01) |
| *B33Y 30/00* | (2015.01) |
| B29C 64/153 | (2017.01) |

(52) U.S. Cl.

CPC ............ *B29C 64/236* (2017.08); *B33Y 10/00* (2014.12); *B33Y 30/00* (2014.12); *B29C 64/153* (2017.08)

(56) References Cited

FOREIGN PATENT DOCUMENTS

| | | | |
|---|---|---|---|
| EP | 3533588 A1 | | 9/2019 |
| JP | 2001150557 A | * | 6/2001 |

* cited by examiner

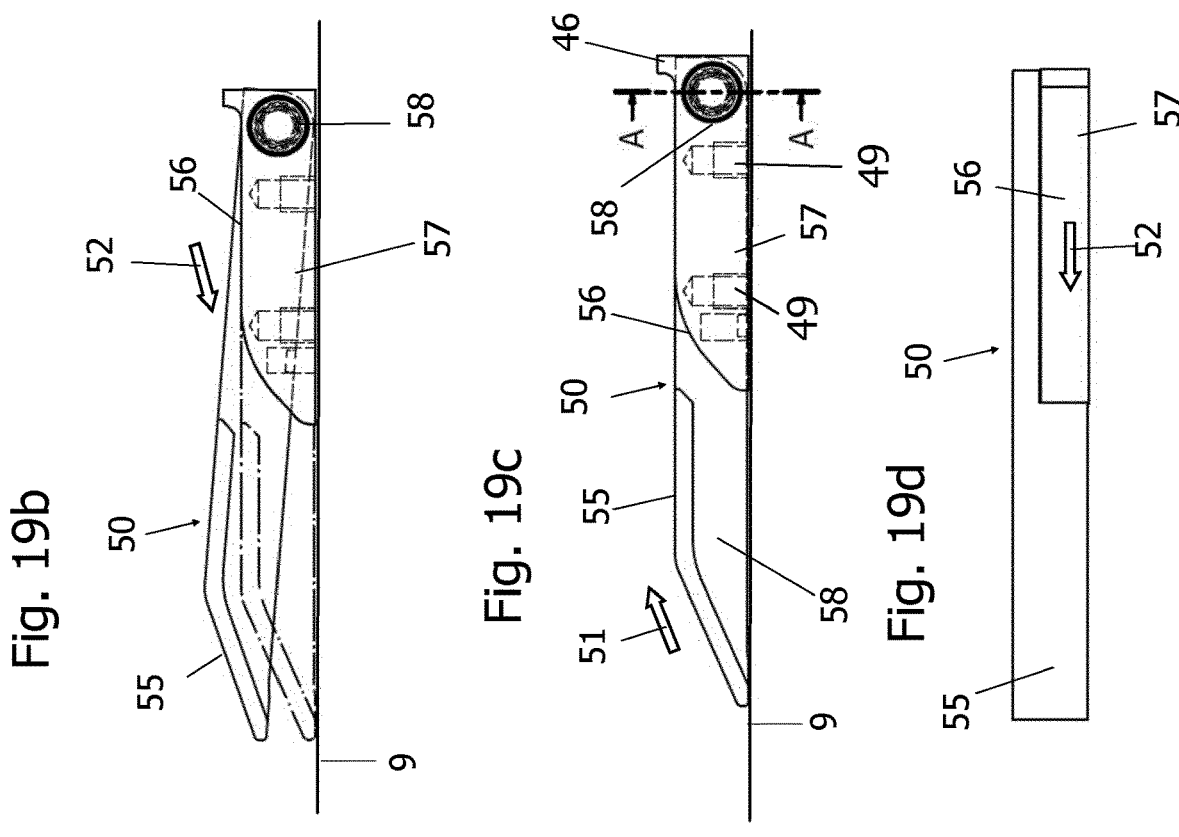
Fig. 19b
Fig. 19c
Fig. 19d
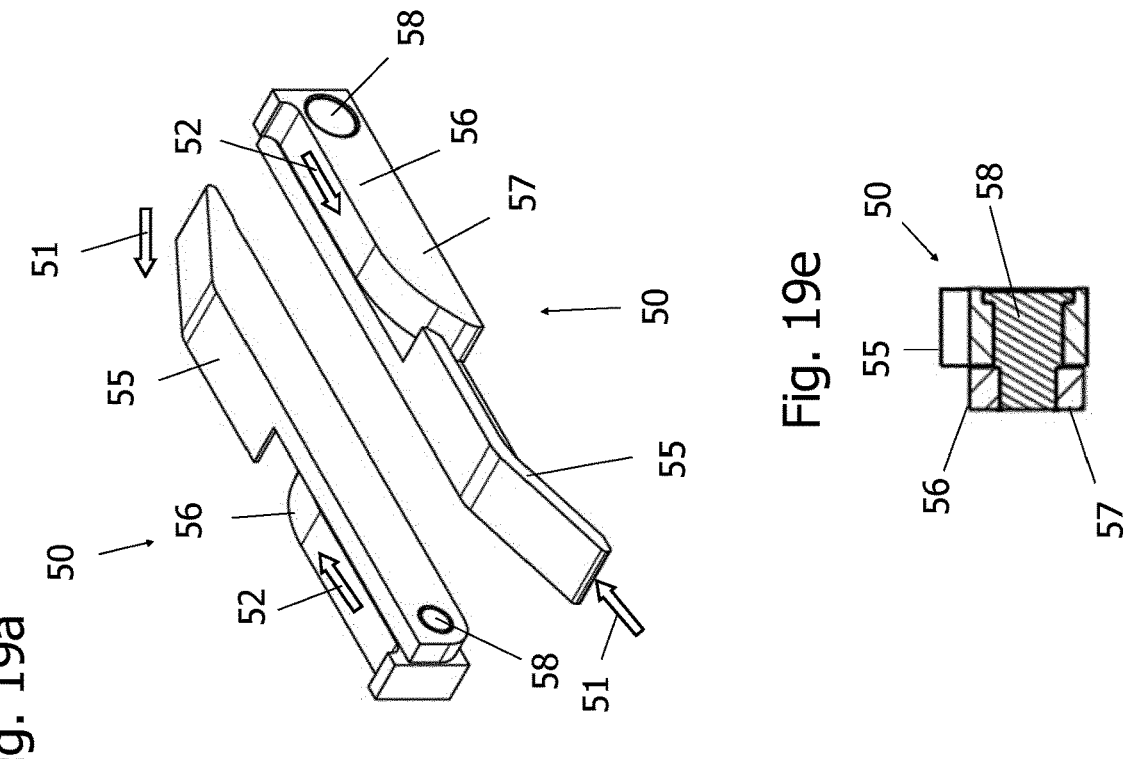
Fig. 19a
Fig. 19e

RAW MATERIAL POSITIONING UNIT FOR AN ADDITIVE MANUFACTURING DEVICE AND METHOD FOR RAW MATERIAL SUPPLY

CROSS-REFERENCE TO RELATED APPLICATIONS

This application is a U.S. national stage filing under 35 U.S.C. 371 of international patent application no. PCT/EP2022/069361, filed on Jul. 11, 2022, which claims priority to European patent application no. 21185131.6, filed on Jul. 12, 2021, and European patent application no. 21185132.4, filed on Jul. 12, 2021, the contents of all of which are incorporated herein by reference in their entirety.

BACKGROUND

This invention relates to a raw material positioning unit for an additive manufacturing device. The invention further relates to a method for supplying a raw material to a build unit of an additive manufacturing device. The raw material can be a flowable material, in particular a powder or slurry. This invention also relates to a device for additive manufacturing including a raw material positioning unit.

PRIOR ART

An additive manufacturing device is for instance known from EP 3310556 A1 or from EP 3533588 A1. As shown in particular in FIG. 6 or FIG. 7 of EP 3533588 A1 an additive manufacturing device comprises a raw material processing unit including a material container unit which comprises a build unit of circular cross-section and a first and second raw material container of rectangular cross-section. Furthermore, an opening is provided between the second raw material container and the wall. The opening is configured to receive any spent raw material from the recipient of the build unit and/or any superfluous raw material from one of the first or second raw material containers. The raw material positioning unit is configured to move any raw material and any spent raw material to the opening. The raw material and the spent raw material fall through this opening and accumulate in a raw material disposal unit which is shown in an embodiment in FIG. 7. The cover of the raw material processing unit can thus be cleaned from any raw material or spent raw material accidentally flowing out of any of the first or second raw material containers.

This raw material processing unit operates entirely satisfactorily. In order to obtain an entirely planar raw material surface in the build unit, it is required to distribute more raw material than actually needed for the preparation of each layer for each added manufacturing step. The superfluous raw material is disposed either in the first or second raw material container or in the opening. In this embodiment, only one opening is provided which is arranged on the left side of the left raw material container. On the right side of the build unit, there is only arranged a raw material container, but no opening. In order to dispose superfluous raw material accumulated on the right side of the build unit, the drive unit on the right side has been lowered to increase the volume of the raw material container so that the superfluous raw material can be filled into the raw material container on the right side. However, the time required for actuating the drive unit, lowering the raw material chamber bottom, and rising it again for applying the subsequent raw material layer, amounts to about a second per layer. For a complex article manufactured from hundreds of layers, the time may well amount to an hour or more.

It has been considered in US2019/0118466 A1 to decrease the time required to supply the raw material to the build unit by making use of a modified raw material supply unit. The raw material supply unit of US2019/0118466 A1 consists of two raw material application elements which are moved in a circuit. The circuit is composed of four linear motion paths for the each of the two raw material application elements. The first raw material application element travels along the first linear motion path to deliver raw material from the raw material container to the build unit. At the same time, the second raw material application element travels along the third linear motion path in the opposite direction. The first linear motion path is thus either located parallel to the third linear motion path or the third linear motion path is located above the first linear motion path to avoid any collision of the first and second raw material elements when traveling concurrently. As the first and third linear motion paths are thus vertically or horizontally offset with respect to each other, a second and fourth linear motion path is required which connects the first and third linear motion paths respectively so that the first and second raw material application elements can move along the circuit. The use of two raw material application elements certainly increases the speed of raw material supply and also provides the possibility to dispose of any excess raw material which is pushed by each of the raw material application elements to an overflow device.

However, the overflow device is filled up quickly if a certain amount of raw material is required for each layer and has to be replaced quite often. Furthermore, the required circuit for the first and second material application element requires additional space either in a horizontal plane if the circuit is configured as a loop in a horizontal plane or above the build unit if the circuit is configured as a loop in a vertical plane.

It is therefore an object of the invention to provide a raw material positioning unit for recovering the excess raw material which had not been used for manufacturing the solid article more efficiently with only a minimal additional space required for the material application unit. It is also an object of the invention to provide a method for supplying a flowable raw material to a build unit in a more efficient way, in particular to supply the flowable raw material to the build unit in less time.

SUMMARY OF THE INVENTION

The problem is solved by a method for supplying a raw material to a build unit according to claim 1. Further advantageous variants of the method are subject to claims 2 to 6.

The problem is solved by an additive manufacturing device including the raw material positioning unit according to claim 7. Further advantageous embodiments of the raw material positioning unit are subject to claims 8 to 20.

If the term "for example" is used in the following description, this term relates to exemplary embodiments and/or variants, which is not necessarily to be understood as a more preferred application of the teaching of the invention. The terms "preferably", "preferred" are to be understood in a similar manner by referring to an example from a set of embodiments and/or variants, which is not necessarily to be understood as a preferred application of the teaching of the invention. Accordingly, the terms "for example", "preferably" or "preferred" can relate to a plurality of embodiments and/or variants.

The following detailed description contains various exemplary embodiments for the additive manufacturing device, the raw material positioning unit according to the invention and the additive manufacturing device including the raw material positioning unit. The following detailed description further contains a method for supplying a raw material to a build unit. The description of a particular raw material positioning unit or additive manufacturing device or corresponding method is to be regarded as exemplary only. In the description and claims, the terms "contain", "comprise", "have" are interpreted as "including, but not limited to".

An additive manufacturing device for manufacturing a solid article comprises a flowable raw material and a raw material processing unit. The raw material processing unit comprises a raw material container unit, a build unit, and a raw material positioning unit. The build unit comprises a recess in a raw material processing unit surface. The raw material positioning unit comprises a raw material distribution unit, a guide unit, and a drive unit. The drive unit is configured to move the raw material distribution unit with respect to the guide unit to supply the main raw material portion to the build unit. The raw material positioning unit comprises a switch for directing the raw material distribution unit in a first direction onto a first path. The first path is configured such that the distance between the raw material processing unit surface and the raw material distribution unit is increased when the raw material distribution unit travels along the first path to deposit the residual raw material on the raw material processing unit surface. The raw material positioning unit is configured to reverse the movement of the raw material distribution unit after completion of the deposit of the residual raw material on the raw material processing unit surface. The switch is configured to be actuated to direct the raw material distribution unit onto a second path in a second direction opposite to the first direction, wherein the second path is arranged parallel to the raw material processing unit surface. The raw material positioning unit is configured to move the raw material distribution unit along the second path for picking up the deposited residual raw material and distributing the residual raw material to the build unit.

According to an embodiment, the guide unit comprises at least one of a guide rail or a cable. According to an embodiment, the cable comprises a profile. In particular, the profile can include a first cable and a second cable. Most preferred, the first cable is configured as a straight first cable and the second cable is configured as a spiral-shaped second cable wound around the first cable. A cable of this particular configuration is particularly advantageous as it can be moved by a form-fitting drive unit, e.g., a cable drum with a corresponding profile or a gear unit. The cable drum or the gear unit can be rotated by a drive unit. The cable performs in operation an oscillating movement. The raw material distribution unit attached to the cable therefore also performs an oscillating movement if the drive unit is in operation. The raw material distribution unit can be provided with an engagement element, which is configured to engage with the switch. A cable with a profile can thus engage with the corresponding drive unit in a form-fitting connection. The movement of the raw material distribution unit is therefore not dependent on the friction between the cable and the cable drum. If the cable is driven only by frictional force, any change of the frictional force may cause a sliding of the cable and therefore a less exact movement of the raw material distribution unit.

A change of the frictional force may be caused by friction-reducing substances coming into contact with the cable, such as lubricants, or a reduction of the tension of the cable, which could be caused by an elongation of the cable or other wear effect as a consequence of aging effects or as a consequence of prolonged and/or continuous use.

According to an embodiment, the switch comprises one of a hydraulically or pneumatically actuatable pressure cylinder or a support or the switch is electrically actuatable. According to an embodiment, the guide unit is movable together with the raw material distribution unit. According to an embodiment, the raw material distribution unit is attached to the guide unit. According to an embodiment, the distance between the raw material distribution unit and the raw material processing unit surface is constant along the second path. According to an embodiment, the guide unit is adjustable in its length.

According to an embodiment, the guide unit is elastically deformable or contains an elastically deformable compensation element. According to an embodiment, the guide unit comprises a cable loop. According to an embodiment, the cable loop comprises a plurality of cable segments. According to an embodiment, one of the cable segments is attachable to the drive unit. According to an embodiment, the drive unit is configured as a cable drum.

According to an embodiment the switch is configured as a support element including a first guide element and a second guide element, wherein the second guide element is movable relative to the first guide element. In particular, the second guide element is movable between an upper position and a lower position.

A raw material positioning unit for an additive manufacturing device for manufacturing a solid article comprises a raw material distribution unit, a guide unit, and a drive unit, wherein the drive unit is configured to move the material distribution unit with respect to the guide unit for the transport of a flowable raw material over a raw material surface. The raw material positioning unit comprises a switch for directing the raw material distribution unit alternatively onto a first path or a second path. The distance between the raw material distribution unit and the raw material surface can be adjusted based on the path chosen. In particular, the raw material distribution unit can travel at a greater distance to the raw material surface when traveling via the first path as compared to traveling via the second path.

According to an embodiment, the raw material distribution unit comprises a recoater. The recoater is in particular configured to move the flowable raw material to a build unit, which includes a recess in the raw material surface for receiving at least a raw material portion. The raw material portion can comprise a main raw material portion and a residual raw material portion. In particular, the raw material portion can consist of a main raw material portion and a residual raw material portion. The main raw material portion is in particular received in the build unit and the residual raw material portion is deposited on the raw material surface for being recycled in a subsequent manufacturing step. In particular, the residual raw material portion is deposited next to the recess of the build unit. The residual raw material portion can be configured as a heap.

According to an embodiment, the second path is located below the first path.

According to an embodiment, the guide unit comprises at least one of a guide rail or a cable.

According to an embodiment, the switch comprises one of a hydraulically or pneumatically actuatable pressure cylinder or a support or is electrically actuatable. An electrical actuator can be used for obtaining an electrically actuatable switch, for instance, a stepper or DC motor (direct current motor). According to an embodiment, the switch comprises a switch guide element.

According to an embodiment, the raw material distribution unit is movable relative to the guide unit by actuation of the drive unit.

According to an embodiment, the guide unit is movable together with the raw material distribution unit. In particular, the raw material distribution unit can be attached to the guide unit.

According to an embodiment, the distance between the raw material distribution unit and the raw material surface is increased when the raw material distribution unit travels on the first path. The raw material surface can in particular correspond to a raw material processing unit surface. The raw material surface can correspond to the upper plane of the raw material processing unit.

According to an embodiment, the distance between the raw material distribution unit and the raw material surface is constant when the raw material distribution unit travels on the second path.

According to an embodiment, the guide unit is adjustable in its length. In particular, the cable is adjustable in its length. The guide unit can be elastically deformable or can contain an elastically deformable compensation element.

According to an embodiment, the cable loop comprises a plurality of cable segments. At least one of the cable segments can be attachable to the drive unit.

A raw material positioning unit according to any of the embodiments may be used in an additive manufacturing device. The raw material positioning unit may in particular be used in a raw material processing unit for an additive manufacturing device.

According to an embodiment, the raw material is a raw material in a flowable state, thus the raw material is configured as a flowable raw material. A raw material can in particular be selected from the group consisting of a liquid or a powder.

The invention further relates to a method for supplying a flowable raw material to a raw material processing unit of an additive manufacturing device, wherein the raw material processing unit comprises a build unit, which comprises a recess in a raw material processing unit surface, and a raw material supply unit, wherein a raw material portion of the flowable raw material is supplied to the build unit by the raw material supply unit. The raw material supply unit includes a raw material container unit and a raw material positioning unit. The raw material positioning unit is configured to move the raw material portion from the raw material container unit to the build unit to form the raw material layer for the respective additive manufacturing step. The raw material portion comprises a main raw material portion and a residual raw material portion, wherein the main raw material portion forms the raw material layer in the build unit and wherein the raw material positioning unit deposits the residual raw material portion on the raw material processing unit surface after supplying the main raw material portion to the build unit. The raw material positioning unit comprises a raw material distribution unit, a guide unit, and a drive unit, wherein the drive unit moves the raw material distribution unit along the guide unit to supply the main raw material portion to the build unit. The raw material positioning unit comprises a switch for directing the raw material distribution unit onto a first path, whereby the distance between the raw material processing unit surface and the raw material distribution unit is increased when it travels along the first path to deposit the residual raw material on the raw material processing unit surface to form a deposited residual raw material. The direction of the movement of the raw material distribution unit is reversed after the deposit of the residual raw material is completed and the switch is actuated to direct the raw material distribution unit onto a second path essentially parallel to the raw material processing unit surface, wherein the raw material distribution unit travels back along the second path thereby picking up the deposited residual raw material and distributing the residual raw material to the build unit.

According to an embodiment, the flowable raw material in the raw material container unit is moved upwardly in a stepwise manner to provide the raw material portion.

According to an embodiment, the build unit comprises a recipient including a movable recipient bottom, wherein the movable recipient bottom is lowered to provide a filling space for the main raw material portion.

According to an embodiment, the main raw material portion is filled in the filling space by the raw material distribution unit.

According to an embodiment, the raw material container unit comprises a first raw material container unit and a second raw material container unit.

According to an embodiment, the raw material positioning unit is moved along the first path to deposit the residual raw material on the raw material processing unit surface and wherein the raw material positioning unit is moved along the second path to move the residual raw material portion and a further raw material portion on top of the previously deposited raw material layer in the build unit after an additive manufacturing step has been completed to form a portion of a solid article in the corresponding topmost raw material layer in the build unit.

The invention further relates to a method for supplying a raw material to a build unit of an additive manufacturing device, wherein the raw material is supplied to the build unit by a raw material supply unit, wherein the raw material supply unit provides a raw material portion for each additive manufacturing step, wherein a raw material layer is formed in the build unit by the raw material portion, characterized in that the raw material portion contains a main raw material portion and a residual raw material portion, wherein the main raw material portion forms the raw material layer in the build unit and wherein the residual raw material portion is deposited on a surface external to the build unit by the raw material supply unit.

According to an embodiment, the raw material supply unit includes a raw material container unit and a raw material positioning unit. The raw material positioning unit can move the raw material portion from the raw material container unit to the build unit to form the raw material layer. According to an embodiment, the raw material positioning unit comprises a raw material distribution unit which is moved parallel to the surface of the raw material layer to move the raw material portion over the surface from the raw material container unit to the build unit. The raw material portion can be supplied by the raw material distribution unit to the build unit. According to an embodiment, the raw material in the raw material container unit is moved upwardly in a stepwise manner to provide the raw material portion.

According to an embodiment, the build unit comprises a recipient including a movable recipient bottom, wherein the recipient bottom is lowered to provide a filling space for the raw material portion. The main raw material portion can be filled in the filling space by the raw material distribution unit. The raw material positioning unit can move the residual raw material portion to the surface. According to an embodiment, the raw material positioning unit is moved upwardly to deposit the residual raw material on the surface. According to an embodiment, the surface contains an intermediate storage space for the residual raw material portion.

According to an embodiment, a second raw material container unit containing a second raw material is arranged on an opposite side of the build unit, and the raw material container unit is configured as a first raw material container unit. The second raw material can be provided with a second raw material surface, which is configured as the intermediate storage space.

According to an embodiment, the raw material positioning unit comprises a switch for directing the raw material distribution unit alternatively onto a first path or a second path. The raw material positioning unit can be moved along the first path to deposit the residual raw material on the surface. The raw material positioning unit can be moved along the second path to move the residual material and/or a further portion of raw material on top of the previously deposited raw material layer in the build unit after an additive manufacturing step has been performed. By completing the additive manufacturing step, a portion of a solid article is manufactured in the main raw material layer portion in the build unit. An energy beam can be directed onto the main raw material layer portion in the build unit. The raw material spot exposed to the energy beam is heated in any location of the main raw material layer portion which is exposed to the energy beam. The energy beam usually melts the raw material at least at the raw material spot, whereby a coherent sub-structure is formed in the raw material layer. The coherent sub-structure at the spot differs from the raw material, which is not exposed to the energy beam, which is usually in a flowable state. Under the flowable state, it to be understood an aggregate state, which can be one of a powder or a liquid or any combination of liquid and powder such as a slurry.

This coherent sub-structure solidifies as soon as the energy beam is redirected to another location or spot of the main raw material layer portion. The coherent sub-structure adheres also to any coherent sub-structure present below the main raw material layer portion, e.g., in a previously applied raw material layer which had been exposed to the energy beam during a previous additive manufacturing step completed in a previous time period.

According to an embodiment, the residual raw material is moved by the raw material positioning unit to a raw material disposal unit before a subsequent additive manufacturing step is initiated.

According to an embodiment, a method for supplying a raw material to a build unit of an additive manufacturing device is disclosed, wherein the raw material is stored in a raw material container unit, wherein the raw material is provided by a raw material distribution unit to the build unit in a raw material portion for each additive manufacturing step. The raw material portion is deposited in the build unit, when the raw material positioning unit moves the raw material portion supplied from the raw material container unit to the build unit to form the uppermost raw material layer. The raw material portion contains a main raw material portion and a residual raw material portion. The main raw material portion forms the raw material layer in the build unit and the residual raw material portion is deposited on a surface external to the build unit by the raw material positioning unit. That means that the residual raw material portion is deposited outside of the build unit. In other words, the raw material portion contains more raw material than required for the formation of the raw material layer, such that the residual raw material portion is available after the supply of the main raw material portion to the build unit has been completed. The residual raw material portion is thus not used for the raw material layer in the build unit.

In a subsequent raw material supply step for performing a subsequent additive manufacturing step, the raw material in the raw material container unit is elevated to provide a further portion of raw material. The raw material in the raw material container unit can be elevated by a raw material container drive unit. The raw material positioning unit can supply the further portion of raw material to the build unit, such that a further raw material layer is formed on top of the raw material layer by the material positioning unit. According to an embodiment, the further raw material portion contains more raw material than required for the formation of the topmost further layer in the build unit. A main further raw material portion is filled in a filling space provided in the build unit. A further raw material residual portion is supplied to the surface external to the build unit. The method can thus be repeated until all raw material layers required for the manufacture of the solid article by an additive manufacturing method are provided in the build unit. In other words, a plurality of raw material layers is formed in the build unit, wherein each raw material portion is used to form one of the raw material layers.

According to an embodiment the raw material portion is raised above the surface by the raw material container drive unit before the raw material positioning unit moves the raw material portion to the build unit. According to an embodiment, the build unit comprises a recipient with a moveable recipient bottom and a build unit drive unit for moving the recipient bottom away from the surface. That means, the distance between the surface and the recipient bottom increases continuously when the additive manufacturing method progresses. A filling space is formed in the build unit after the recipient bottom has been moved away from the surface by a specified distance. The specified distance can in particular correspond to the thickness of a raw material layer.

According to an embodiment, the filling space is filled by the raw material portion which is moved from the raw material container to the build unit by the positioning unit. In particular, the raw material portion provided by the raw material supply unit has a greater mass than the raw material portion required to fill the filling space. According to an embodiment, the residual raw material portion is positioned by the raw material positioning unit onto the surface outside of the build unit. In particular the raw material positioning unit is moved along the first path to deposit the residual raw material on the surface. According to an embodiment, the raw material positioning unit is moved along the second path to move the residual raw material portion and/or the further raw material portion on top of the previously deposited raw material layer in the build unit after an additive manufacturing step has been completed to form a portion of a solid article in the corresponding topmost raw material layer in the build unit.

According to an embodiment, the residual raw material portion is moved to a raw material disposal unit by the raw material positioning unit.

The raw material positioning unit and the method for supplying a raw material to a build unit according to any of the previous embodiments can be used for any type of raw material in particular for a compressible raw material. In particular, the raw material positioning unit and the method for supplying a raw material to a build unit according to any of the previous embodiments can be used for raw materials having elastic properties. Some raw materials also show a relaxation effect if compressed. If such raw materials are processed by conventional methods in conventional raw material positioning units, difficulties in metering an exact amount of the required raw material portion to the build unit have been observed. According to a conventional additive manufacturing method, the raw material container unit performs both an ascending as well as a descending movement. The raw material container unit performs a descending movement to receive any residual raw material portion which remains on the surface after the filling space of the build unit is filled with the main raw material portion. The raw material container unit performs an ascending movement to provide the raw material portion for the build unit for completion of an additive manufacturing method step.

The descending movement of the raw material container unit and the subsequent ascending movement are to be completed within the shortest possible time period, which means within a couple of seconds. A solid article manufactured by an additive manufacturing device may contain a large number of layers. At least 100 layers may be required, depending on the size of the solid article, also 1000 layers or more could be required. The supply of a raw material portion to the build unit has to be completed for each additive manufacturing step. If a second can be saved with each of these raw material supply method steps, up to 100 seconds, in particular up 1000 seconds can be saved for the manufacture of the solid article. Therefore, the total production time for the solid article may be reduced by a couple of minutes up to a couple of hours depending on the dimensions of the solid article.

If the descending movement and a subsequent ascending movement of the raw material in the raw material container unit have to be completed at high frequency, the raw material has no time to settle, which leads to an incomplete compaction of the raw material. Depending on the raw material characteristics this effect can result in an unexpected change of density of the raw material leading to an unexpected change of mass or volume. If a defined mass of raw material is to be provided for each raw material portion, the corresponding volume of the raw material portion may vary. The raw material positioning unit may therefore provide either too much raw material to the build unit if the raw material has a higher density than expected or not enough raw material to the build unit if the raw material has a lower density than expected. Therefore, the volume of raw material available for the transport to the build unit varies depending on the properties of the raw material. As a result, a precise dosing or metering of the raw material portion for the build unit is not possible. Experimental evidence has shown that raw materials with elastic properties, such as elastomers could not be metered to the build unit with a satisfactory precision. Furthermore, also polymers, in particular thermoplastic polymers are subject to this effect.

Such raw materials are often provided as powders. The mass of the powder particles, the size of the powder particles, the water content, the shape of the powder particles, the temperature can have an influence on their compressibility. It has been surprisingly found that the compressibility can be predicted with sufficient precision in particular for raw materials with resilient or elastic properties if the descending movement of the raw material powder in the raw material powder container unit can be dispensed with. Surprisingly, the resilient or elastic properties of the raw materials do not play a prominent role anymore if the descending movement of the raw material in the raw material container unit can be omitted. Therefore, according to an embodiment of the invention, the raw material in the raw material container unit is subjected only to a lifting movement. The raw material in the raw material container unit is in particular lifted in a stepwise manner by actuating the raw material container drive unit.

According to an embodiment, the movement of the raw material in the raw material supply container can be initiated already during the completion of the additive manufacturing step or after the residual raw material portion has been deposited on the surface. In particular if the raw material positioning unit comprises a switch, the raw material distribution unit is moved upwardly to avoid contact with any residual raw material portion present on the surface or on top of the raw material in the raw material container. The switch is actuated to direct the raw material distribution unit to a first path. When the raw material distribution unit travels along the first path, the distance to the surface is greater than when it travels along the second path. The switch is actuated to direct the raw material distribution unit to the second path after the raw material has been lifted, such that a raw material portion is provided on the surface. The raw material distribution unit traveling along the second path is configured to push the raw material portion to the build unit. The raw material portion falls into the filling space provided in the build unit. The filling space has been provided by moving the recipient bottom containing previous raw material layers and the corresponding solid article portions to a greater distance from the surface. The movement of the recipient bottom occurs in many embodiments in a downward direction.

The raw material distribution unit can continue its travel path either straight along the second path to move any residual raw material portion into a raw material disposal unit or actuate a further switch to deposit the residual raw material portion on the surface.

The residual raw material portion can therefore be removed if it had been contaminated by the additive manufacturing step or if agglomerates were formed. If no contaminations or agglomerates are detectable, the residual raw material portion can be re-used for a subsequent raw material supply step.

BRIEF DESCRIPTION OF THE DRAWINGS

A number of embodiments of the invention are shown in the subsequent drawings. It is shown in:

FIG. 19*a* a view of a switch according to a second exemplary embodiment in two different mounting positions, FIG. 19*b* a side view of the switch of FIG. 19*a* showing two switch positions, FIG. 19*c* a side view of the switch of FIG. 19*a* in a single switch position, FIG. 19*d* a top view of the switch of FIG. 19*a*, FIG. 19*e* is a sectional view taken along the section A-A of FIG. 19*c*.

DETAILED DESCRIPTION OF THE DRAWINGS

Figure 1:
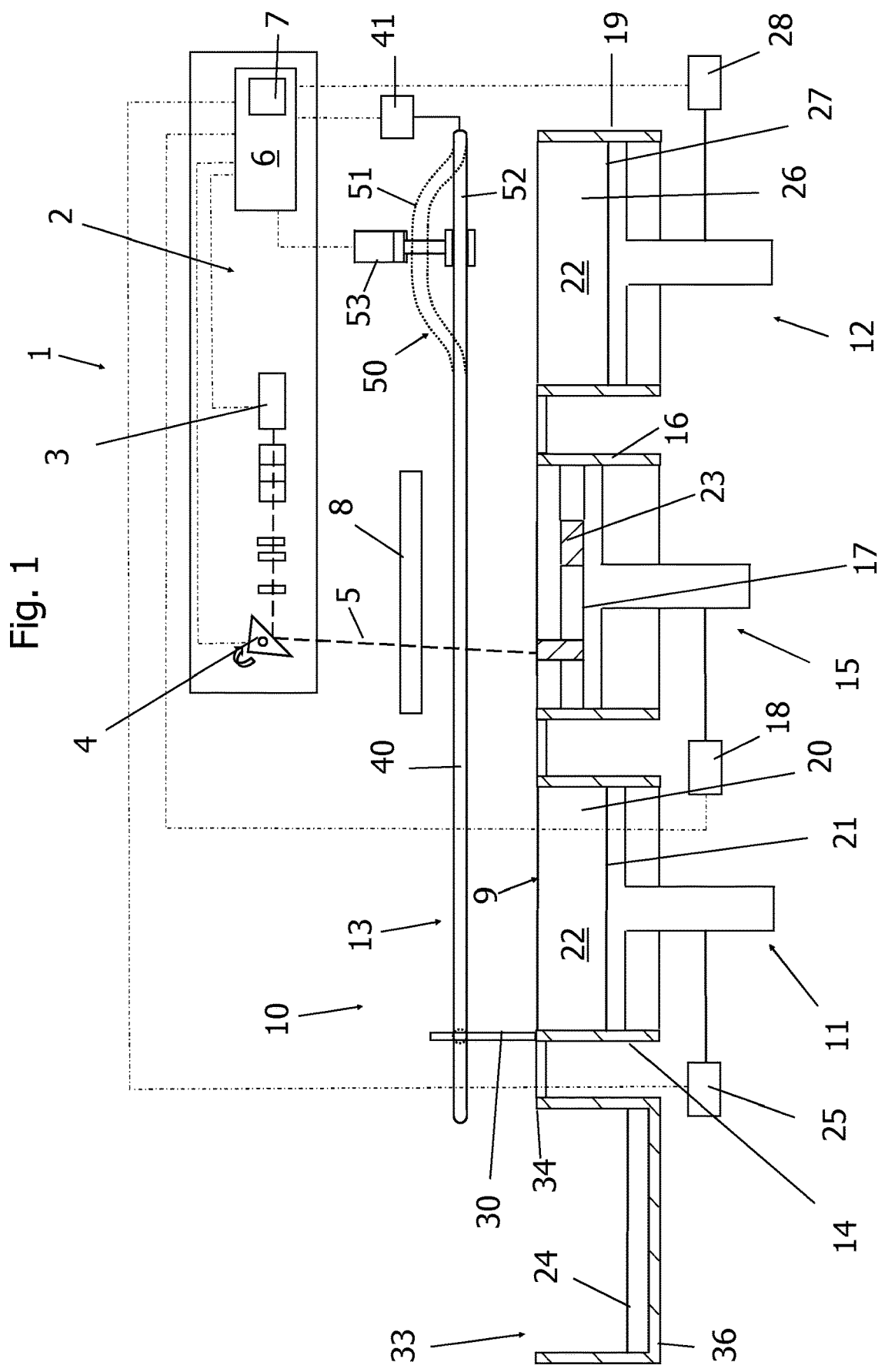
FIG. 1 a schematic section of an additive manufacturing device according to a first embodiment of the invention including a raw material processing unit for performing an additive manufacturing process, FIG. 2 the raw material processing unit of the first embodiment of the invention during a raw material supply step from first the raw material container unit, FIG. 3 the raw material processing unit of the first embodiment of the invention for the preparation for a subsequent additive manufacturing step, FIG. 4 the additive manufacturing device of the first embodiment of the invention during performance of the subsequent additive manufacturing process step and a subsequent or concurrent raw material supply step from the second raw material container unit, FIG. 5 the raw material processing unit of the first embodiment of the invention upon completion of the raw material supply step and ready for a subsequent additive manufacturing step, FIG. 6 a schematic section of an additive manufacturing device of a second embodiment of the invention including a raw material processing unit for performing an additive manufacturing process, FIG. 7 the raw material processing unit of the second embodiment of the invention upon completion of a raw material supply step from the raw material container positioned on the left side of the build unit, FIG. 8 the raw material processing unit according to the second embodiment of the invention during a subsequent raw material supply step, FIG. 9 a schematic section through an additive manufacturing device according to a third embodiment of the invention including a raw material processing unit for performing an additive manufacturing process, FIG. 10 the raw material processing unit according to the third embodiment of the invention upon completion of a raw material supply step from the raw material container positioned on the left side of the build unit, FIG. 11 the raw material processing unit according to the third embodiment of the invention during a subsequent raw material supply step, FIG. 12*a* a top view of a raw material processing unit of an additive manufacturing device according to a fourth embodiment of the invention, FIG. 12*b* a section through the additive manufacturing device of FIG. 12*a*, FIG. 12*c* a top view of the raw material processing unit of FIG. 12*a*, FIG. 13*a* a detail of a raw material processing unit according to any embodiment of the invention showing a first phase of a raw material supply step, FIG. 13*b* a detail of the raw material processing unit according to any embodiment of the invention showing a second phase of a raw material supply step, FIG. 13*c* a detail of the raw material processing unit according to any embodiment of the invention showing a third phase of a raw material supply step, FIG. 13*d* a detail of the raw material processing unit according to any embodiment of the invention showing a fourth phase of a raw material supply step, FIG. 14*a* a detail of a variant of a raw material processing unit according to any embodiment of the invention showing a first phase of a raw material supply step, FIG. 14*b* a detail of the raw material processing unit of FIG. 14*a* showing a second phase of a raw material supply step, FIG. 14*c* a detail of the raw material processing unit of FIG. 14*a* showing a third phase of a raw material supply step, FIG. 14*d* a detail of the raw material processing unit of FIG. 14*a* showing a fourth phase of a raw material supply step, FIG. 15 a view of an exemplary embodiment of a guide unit, FIG. 16*a* a detail of a fixation of a cable, FIG. 16*b* a detail of a cable according to a variant, FIG. 17 an exemplary embodiment of a cable drum, FIG. 18*a* a view of a switch according to an exemplary embodiment in two different mounting positions, FIG. 18*b* a side view of the switch of FIG. 18*a* showing two switch positions, FIG. 18*c* a side view of the switch of FIG. 18*a* in a single switch position, FIG. 18*d* a top view of the switch of FIG. 18*a*.

FIG. 1 shows an additive manufacturing device 1 of a first embodiment of the invention. The additive manufacturing device 1 for manufacturing a solid article comprises an energy generation unit 2 and a raw material processing unit 10. The energy generation unit 2 comprises an energy beam generation unit 3. The raw material processing unit 10 comprises a first raw material container unit 11, a build unit 15, a second raw material container unit 12, and a raw material positioning unit 13. The first raw material container unit 11 comprises a first raw material container 14 containing a raw material 22 for the manufacture of a solid article 23. The second raw material container unit 11 comprises a second raw material container 19 also containing the raw material 22 for the manufacture of a solid article 23.

The build unit 15 is configured to receive the raw material 22 from the first raw material container 14 or the second raw material container 19. The raw material positioning unit 13 is configured to transport a portion of the raw material 22 from the first raw material container 14 or the second raw material container 19 to the build unit 15. The first raw material container 14 comprises a first raw material chamber 20 of variable volume, wherein the first raw material chamber 20 comprises a first raw material chamber bottom 21. The first raw material chamber bottom 21 is connected to a first raw material container drive unit 25 for moving the first raw material chamber bottom 21 to change the volume of the first raw material chamber 20 when in operation. The second raw material container 19 comprises a second raw material chamber 26 of variable volume, wherein the second raw material chamber 26 comprises a second raw material chamber bottom 27. The second raw material chamber bottom 27 is connected to a second raw material container drive unit 28 for moving the second raw material chamber bottom 27 to change the volume of the second raw material chamber 26 when in operation.

The build unit 15 comprises a recipient 16 of variable volume configured to receive the portion of the raw material 22 from the first raw material container 14 or from the second raw material container 19. The build unit 15 comprises a recipient bottom 17 connected to a build unit drive unit 18 for moving the recipient bottom 17 to change the volume of the recipient 16 when in operation.

The raw material processing unit 10 comprises a housing for the first raw material container unit 11, the build unit 15, the second raw material container unit 12 and the raw material positioning unit 13, which is not shown in FIG. 1. Wheels can be provided on the underside of the housing for moving the raw material processing unit freely on a floor.

The raw material processing unit 10 can be removably connectable to the energy generation unit 2 and freely movable in any direction when not connected to the energy generation unit 2 as described in EP 3533588 A1, the contents of which is incorporated for reference in its entirety.

The additive manufacturing device 1 is shown in a schematic view in section. The additive manufacturing device 1 can include a heat exchange unit 8, which can comprise a heat source for heating a raw material 22 provided in the recipient 16, such as described in EP 3310556 A1, the contents of which is incorporated for reference in its entirety. The solid article 23 is generated by an additive manufacturing method in the recipient 16. The additive manufacturing device 1 comprises an energy beam generation unit 3, in particular a diode laser generation unit. A raw material supply unit can be provided for supplying raw material to the first raw material container 14 containing the raw material 22 to be used for manufacturing the solid article 23. A raw material supply unit can also be provided for supplying raw material to the second raw material container 19 containing the raw material 22 to be used for manufacturing the solid article 23.

The raw material 22 has a raw material raw material processing unit surface 9 exposed to an energy beam 5 emitted by the energy beam generation unit 3 when in operation. The energy beam 5 is directed onto the raw material raw material processing unit surface 9. The raw material 22 is heated at the raw material surface in any location which is exposed to the energy beam 5. The energy beam 5 usually melts the raw material 22 at least at the raw material raw material processing unit surface 9 or in the uppermost layer of raw material 11, whereby a coherent sub-structure is formed. The coherent sub-structure at the portion of the raw material which is impinged by the energy beam 5 differs from the raw material, which is usually in a flowable state, which can be one of a powder or a liquid or any combination of liquid and powder such as a slurry. This coherent sub-structure solidifies as soon as the energy beam 5 is redirected onto another location or spot of the raw material raw material processing unit surface 9. The coherent sub-structure adheres also to any coherent sub-structure present below the raw material surface, e.g., in a previously applied layer of raw material which had been exposed to the energy beam 5 in a previous process sequence.

The operation of the energy beam 5 can be controlled by a control unit 6. The energy beam generation unit 3 is disposed with a directing unit 4 to direct the energy beam 5 onto the raw material raw material processing unit surface 9 according to a computer-generated model of the solid article 23 stored in a storage unit 7 associated with the control unit 6. Thereby, the operation of the directing unit 4 is controlled by the control unit 6. The energy beam 5 generated by the energy beam generation unit 3 passes through the optional heat exchange unit 8, which can comprise a heating surface, onto the raw material surface. Thus, the energy beam 5 traverses the heating surface of the heat source. In particular, the heating surface is transparent for an energy beam, e.g., of a diode laser. Advantageously the heating surface is transparent for light of a wavelength in a range of 100 nm up to and including 1 mm.

The generation of a solid article 23 by an additive manufacturing method in the additive manufacturing device 1 involves the following steps. A portion of the raw material 22 stored in the first raw material container 14 or in the second raw material container 19 is supplied as a layer of a thickness of less than 1 mm by the raw material positioning unit 13 to the recipient 16. According to a preferred embodiment, the thickness or height of the layer can be about 100 μm.

The raw material supply unit, which is not shown in FIG. 1, can include a raw material supply container, such as a hopper, which is filled with raw material. The raw material supply container can be movable or can be fixed.

The first raw material container 14 includes a first raw material container drive unit 25 for moving the first raw material chamber bottom 21 of the first raw material container 14 upwardly in a stepwise manner. Thereby the raw material 22 for a new layer of raw material to be supplied on top of the raw material surface is provided. For the generation of each new raw material layer, the first raw material chamber bottom 21 of the first raw material container 14 is moved upwardly in a stepwise manner, such that a portion of the raw material 22 of a volume corresponding to the thickness of a new raw material layer is supplied to the recipient 16 of the build unit 15.

The second raw material container 19 includes a second raw material container drive unit 28 for moving the second raw material chamber bottom 27 of the second raw material container 19 upwardly in a stepwise manner. Thereby the raw material 22 for a new layer of raw material to be supplied on top of the raw material surface is provided. For the generation of each new raw material layer, the second raw material chamber bottom 27 of the second raw material container 19 is moved upwardly in a stepwise manner, such that a portion of the raw material 22 of a volume corresponding to the thickness of a new raw material layer is supplied to the recipient 16 of the build unit 15.

The raw material positioning unit 13 can be used to move the portion of the raw material 22 either from the first raw material container 14 or from the second raw material container 19 to the recipient 16 of the build unit 15. The first raw material chamber 20 of the first raw material container 14 is shown in FIG. 1 in section. The second raw material chamber 26 of the second raw material container 19 is shown in FIG. 1 in section. The front wall of the first raw material chamber 20, the second raw material chamber 26, as well as of the recipient 16 are omitted to show the interior of the first raw material chamber 20, the second raw material chamber 26 and the recipient 16.

The raw material 22 is distributed on the surface of the first or previous layer for which the additive manufacturing method has already been completed. In particular, subsequent layers may be provided alternatively from the first raw material container 14 or the second raw material container 19.

The raw material positioning unit 13 comprises a raw material distribution unit 30, which can be configured as a roller element or as a sliding element or a combination thereof. The raw material distribution unit 30 can perform a sliding or rolling movement. The raw material distribution unit 30 thereby pushes the volume of raw material supplied for generation of the second or subsequent layer to the build unit 15.

The recipient bottom 17 of the recipient 16 is also movable in a direction perpendicular to the raw material surface. A build unit drive unit 18 is connected to the recipient bottom 17. In particular, the recipient bottom 17 is movable downwardly. Each new layer of each portion of the raw material 22 supplied from the first raw material container 14 or the second raw material container 16 is deposited on the previous layer and each of the layers contains a portion of the solid article 23 to be manufactured after an additive manufacturing step has been performed on the previous layer.

The raw material positioning unit 13 for the additive manufacturing device 1 for manufacturing a solid article comprises a raw material distribution unit 30, a guide unit 40 and a drive unit 41. The drive unit 41 is configured to move the raw material distribution unit 30 with respect to the guide unit 40. The raw material positioning unit 13 comprises a switch 50 for directing the raw material distribution unit 30 alternatively onto a first path 51 or a second path 52. The second path 52 is located below the first path 51. According to the embodiment of FIG. 1 the guide unit 40 comprises a guide rail. The raw material distribution unit 30 may be provided with a guide pin protruding into a corresponding cavity of the guide rail. The guide pin may perform a sliding movement in the guide rail. The guide pin may be coupled to a drive unit, which may be configured as a hydraulic or a pneumatic drive unit. According to an embodiment, the guide rail may include a toothed rod for engagement of a gear coupled to the drive unit 41. The drive unit 41 may include a rotary engine.

The switch 50 may include a flexible portion of the guide unit 40. An actuation unit 53 may be provided for switching the flexible portion of the guide unit 40 between the first path 51 and the second path 52.

A raw material disposal unit 33 is configured for the reception of spent raw material 24. According to this embodiment, the raw material disposal unit 33 includes a recipient 36. The recipient 36 is arranged substantially adjacent to the first raw material container 14 and can extend also below the recipient 16 of the build unit 15, what is not shown in FIG. 1. In an embodiment not shown in the drawings, the raw material disposal unit can be arranged adjacent to the second raw material chamber 26. Alternatively, a plurality of raw material disposal units can be provided. The recipient 36 is provided with an opening 34 arranged substantially at the same level as the raw material raw material processing unit surface 9. The opening 34 can be provided in the cover of the raw material processing unit 10 between the first raw material container unit 11 and the corresponding external side wall of the raw material processing unit 10. The external side wall is not shown in the drawings. The opening 34 is configured to receive any spent raw material 24 from the recipient 16 of the build unit 15 and/or any superfluous raw material 22 from one of the first or second raw material containers 14, 19. The raw material positioning unit 13 may be configured to move any raw material 22 and any spent raw material 24 to the opening 34. The raw material 22 and the spent raw material 24 fall through this opening and accumulate in a raw material disposal unit 33. The cover area forming the raw material processing unit surface 9 of the raw material processing unit 10 can thus be cleaned from any raw material 22 or spent raw material 24 accidentally flowing out of any of the first or second raw material containers 14, 19.

Figure 2:
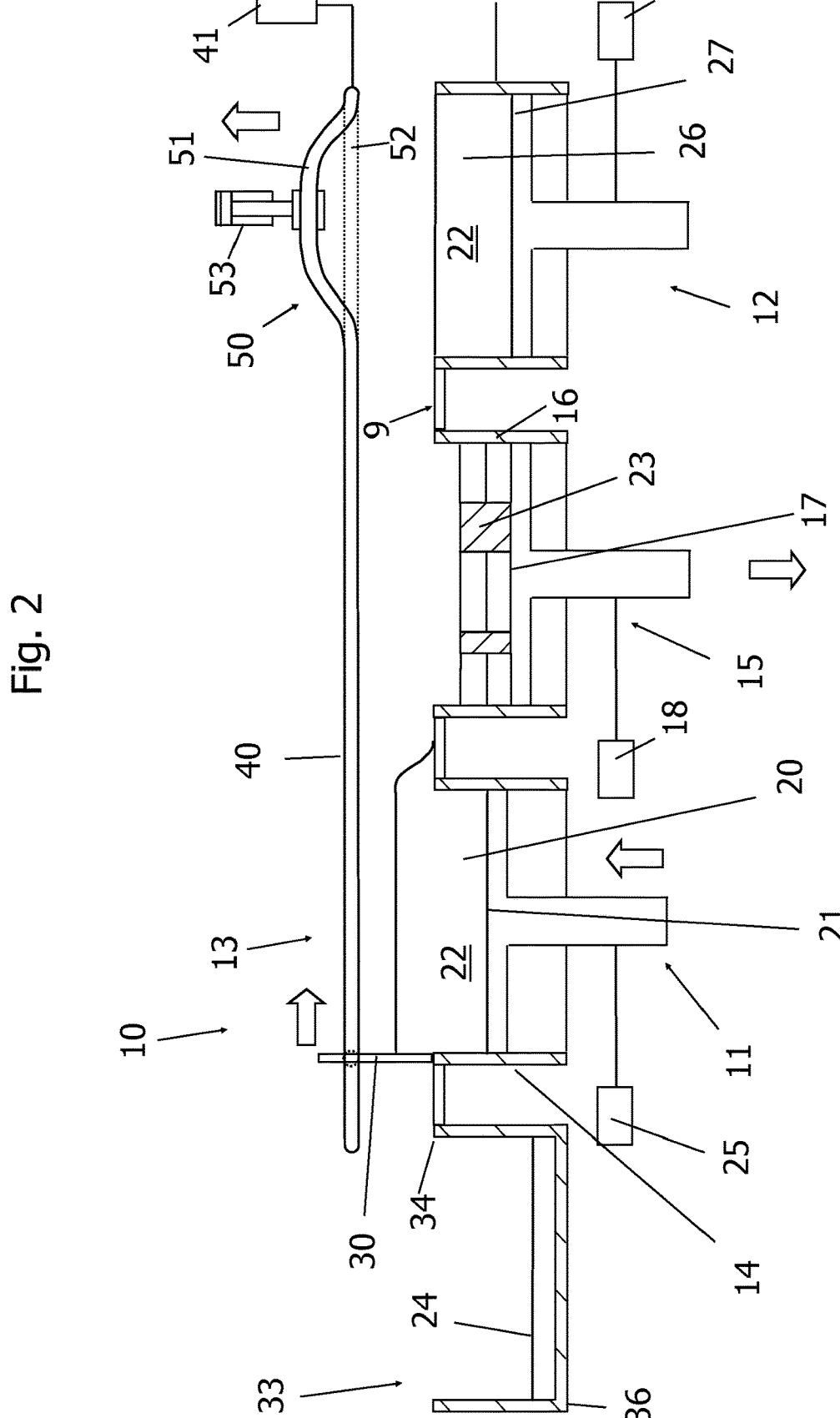

FIG. 2 shows the raw material processing unit 10 according to the first embodiment of the invention during a raw material supply step from first the raw material container unit 11 positioned on the left side of the build unit 15 according to the schematic representation shown in FIG. 2. An additive manufacturing step has just been completed. The recipient bottom 17 is lowered by actuation of the build unit drive unit 18 to provide the required space for an additional layer of raw material 22 to be placed on top of the layers of raw material and the portion of the solid article 23 in the build unit 15. Raw material 22 is to be supplied from the first raw material container unit 11 to the build unit 15. The first raw material chamber bottom 21 is lifted by actuation of the first raw material container drive unit 25. According to this embodiment, the first raw material chamber bottom 21 is lifted to provide a volume of raw material 22 which essentially corresponds to the volume of raw material 22 required to form an additional layer in the recipient 16 of the build unit 15. The lifted raw material 22 thereby forms an elevation extending above the level of the cover of the raw material processing unit 10.

Figure 3:
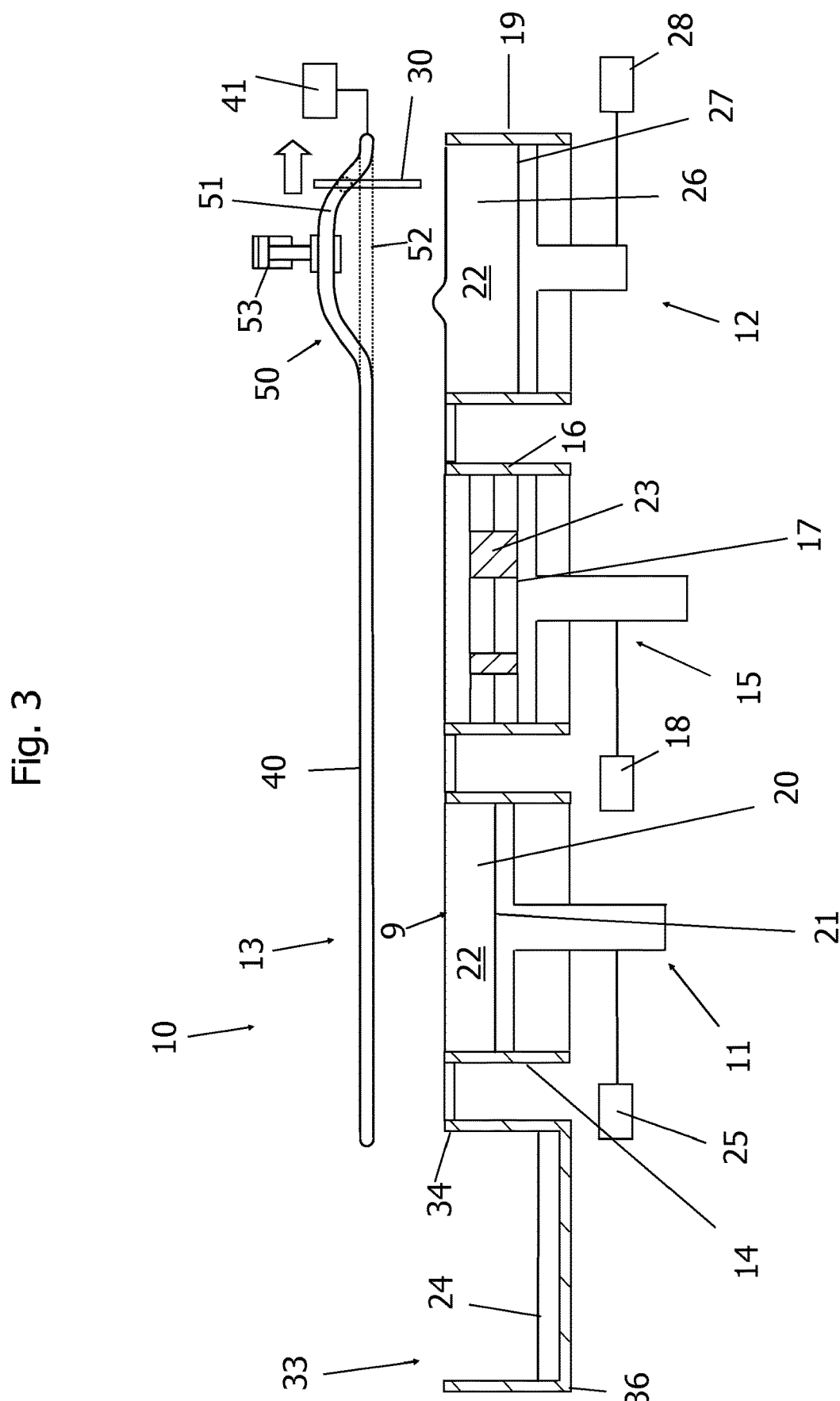

FIG. 3 shows the raw material processing unit 10 according to the first embodiment of the invention for the preparation of a subsequent additive manufacturing step. In FIG. 3, it is shown that the raw material distribution unit 30 is actuated to perform a sliding movement in the guide unit 40. The guide unit 40 includes a first portion, which is straight and a second portion forming either the first path 51 or the second path 52. The raw material distribution unit 30 moves the raw material 22 to the build unit 15. The raw material drops in the space provided in the recipient 16. The raw material distribution unit 30 continues to move along its pathway in the direction of the second portion of the guide unit 40. At latest when the raw material distribution unit 30 has passed the build unit 15, the switch 50 is actuated to direct the raw material distribution unit 30 along the first path 51. The raw material distribution unit 30 still pushes any superfluous raw material in the direction of travel, in FIG. 2 to the right side. When the raw material distribution unit 30 reaches the second portion of the guide unit 40 forming the first path 51, the raw material distribution unit 30 is lifted and any superfluous raw material 22 is deposited on top of the raw material 22 contained in the second raw material container unit 12. The first path 51 follows a curved line involving a first turn and a second turn.

When the raw material distribution unit 30 reaches the first turn it is lifted, when it reaches the second turn it is lowered again to the position which is shown in FIG. 3. At the end of the first path 51, the raw material distribution unit 30 is located at substantially the same altitude as in the first portion of the guide unit 40.

Figure 4:
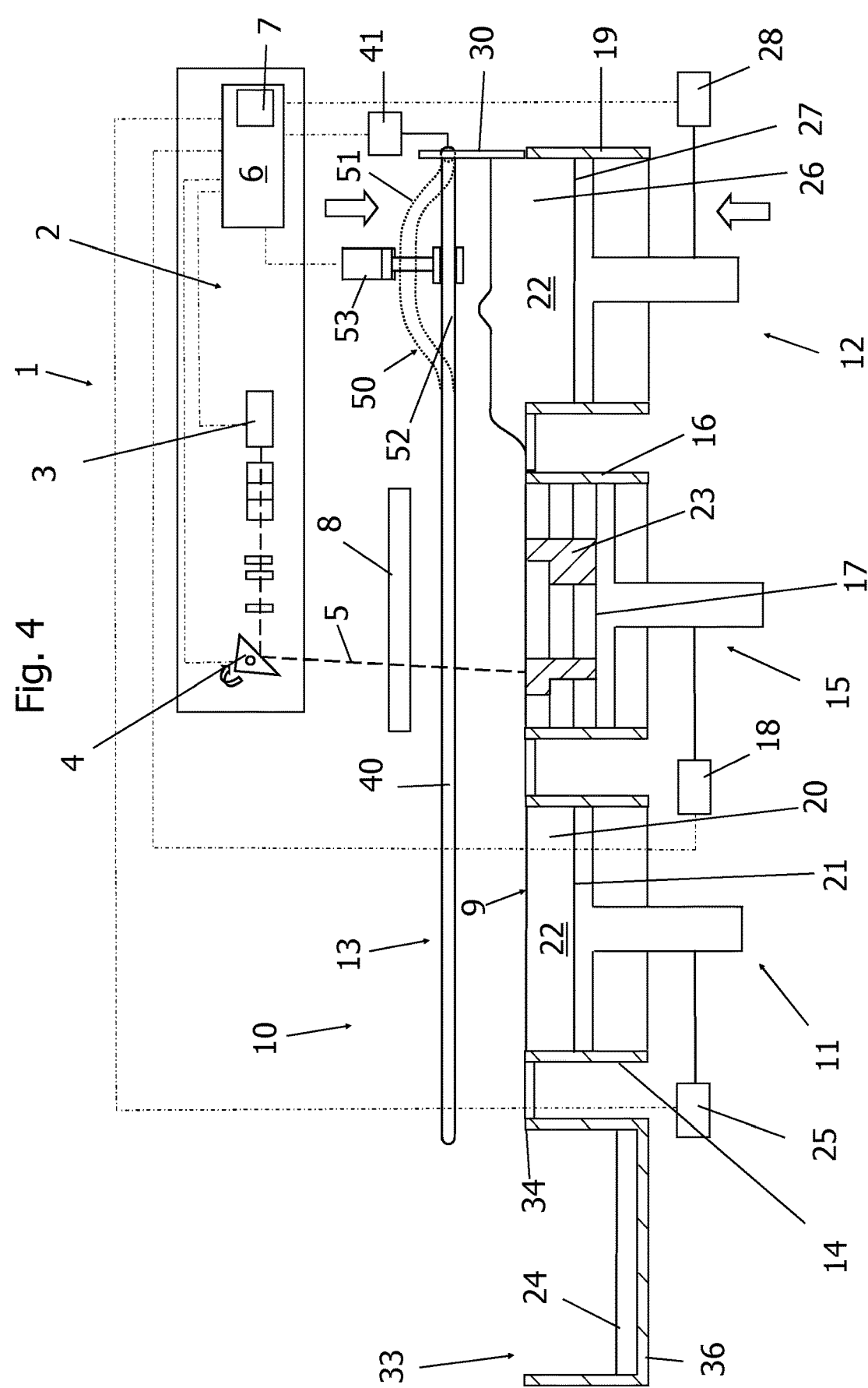

FIG. 4 shows the additive manufacturing device 1 according to the first embodiment of the invention during performance of the subsequent additive manufacturing process step. In FIG. 4, a subsequent or concurrent raw material supply step is also shown which involves the supply of raw material 22 from the second raw material container unit 12 positioned on the right side of the build unit 15. During the additive manufacturing process step, the control unit 6 activates the energy beam generation unit 3 for generating the energy beam 5. The energy beam 5 is directed onto the raw material surface in the build unit 15. The path of the energy beam 5 is controlled by the control unit 6, which actuates the directing unit 4. The directing unit 4 can be configured as a movable mirror element. The control unit 6 includes a processing unit, which calculates the adjustment of the directing unit 4 according to a computer-generated model of the solid article 23 to be manufactured.

Dash-dotted lines show the signal transmission paths leading from the control unit 5 to the directing unit 4, the energy beam generation unit 3, the first raw material container drive unit 25, the build unit drive unit 18, the second raw material container drive unit 28, drive unit 41 and the actuation unit 53 of the raw material positioning unit 13. The beginning and end of each additive manufacturing process step is determined by the control unit 6.

Upon completion of the additive manufacturing process step shown in FIG. 4, a further raw material supply step is initiated. The raw material supply step may be initiated at the same time as the additive manufacturing process step is completed or may be initiated at any point in time thereafter. The raw material supply step involves the actuation of the second raw material container drive unit 28.

Raw material 22 is to be supplied from the second raw material container unit 12 to the build unit 15. The second raw material chamber bottom 27 is lifted by actuation of the second raw material container drive unit 28. According to this embodiment, the second raw material chamber bottom 27 is lifted to provide a volume of raw material 22 which essentially corresponds to the volume of raw material 22 required to form an additional layer in the recipient 16 of the build unit 15. The lifted raw material 22 thereby forms an elevation extending above the level of the cover forming the raw material processing unit surface 9 of the raw material processing unit 10. In addition, the elevation comprises any deposits of superfluous raw material from the previous raw material supply step as described earlier in context with FIG. 2 or FIG. 3.

Before actuation of the drive unit 41 of the raw material processing unit 10, the actuation unit 53 is actuated to activate the switch 50. The switch 50 is actuated to move the second portion of the guide unit 40 from the first path 51 to the second path 52. According to this embodiment, the second portion of the guide unit 40 is lowered so that it forms a straight line with the first portion of the guide unit 40.

Figure 5:
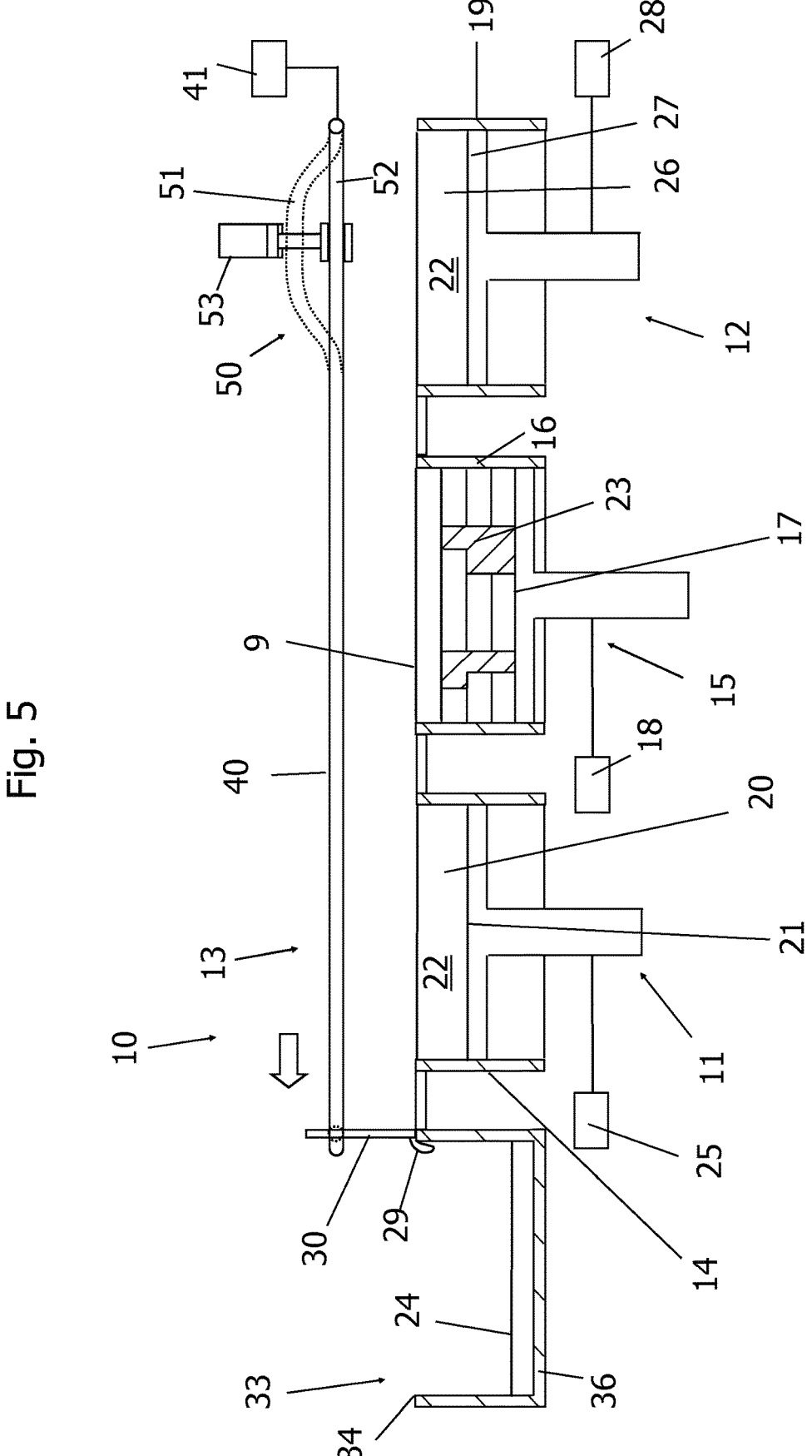

FIG. 5 shows the raw material processing unit 10 according to the first embodiment of the invention upon completion of the raw material supply step which is ready for a subsequent additive manufacturing step. In FIG. 5, the recipient bottom 17 of the build unit 15 has been lowered again at a distance corresponding to the thickness of an additional raw material layer for performing a subsequent additive manufacturing process step. The actuation of the build unit drive unit 18 and the corresponding movement of the recipient bottom essentially corresponds to FIG. 2 and FIG. 3, therefore the visualization of this step has been omitted. Upon completion of the descent of the recipient bottom 17, a subsequent raw material supply step can be initiated.

The actuation of the drive unit 41 initiates the movement of the raw material distribution unit 30 from the second portion of the guide unit 40 to the first portion of the guide unit 40. The raw material distribution unit 30 pushes the raw material 22 to the build unit 15. The raw material 22 is deposited on the raw material processing unit surface 9 corresponding to the level of the cover of the raw material processing unit 10. When the raw material 22 is moved to a position above the recipient 16, the space provided for the raw material 22 in the recipient 16 is filled with this raw material 22. Any superfluous raw material 22 or spent raw material 24 from the build unit 15 is pushed further by the raw material distribution unit 30 over the first raw material container unit 11 to the raw material disposal unit 33. The raw material disposal unit 33 comprises a recipient 36 for receiving the superfluous raw material 22 or the spent raw material 24. If the spent raw material 24 contains impurities or agglomerates, such spent raw material 24 may undergo a pre-treatment step before being reused for a further additive manufacturing process, which is described in more detail for the third embodiment.

Figure 6:
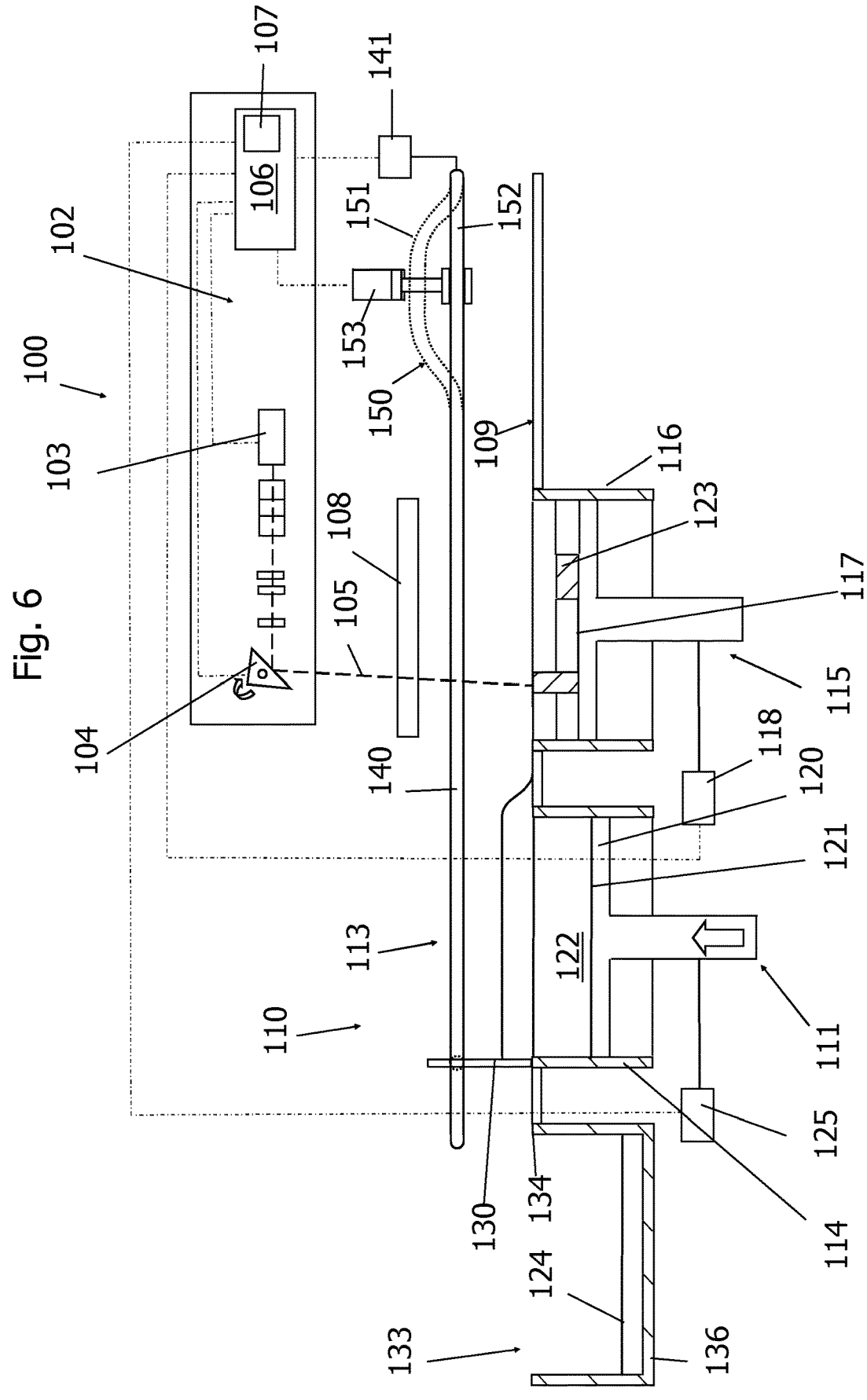

FIG. 6 shows a schematic section of an additive manufacturing device 100 of a second embodiment of the invention including a raw material processing unit 110 for performing an additive manufacturing process. The additive manufacturing device 100 for manufacturing a solid article comprises an energy generation unit 102 and a raw material processing unit 110. The energy generation unit 102 comprises an energy beam generation unit 103. The raw material processing unit 110 comprises a raw material container unit 111, a build unit 115, and a raw material positioning unit 113. The raw material container unit 111 comprises a raw material container 114 containing a raw material 122 for the manufacture of a solid article 123.

The build unit 115 is configured to receive the raw material 122 from the raw material container 114. The raw material positioning unit 113 is configured to transport a portion of the raw material 122 from the raw material container to the build unit 115. The raw material container 114 comprises a raw material chamber 120 of variable volume, wherein the raw material chamber 120 comprises a raw material chamber bottom 121. The raw material chamber bottom 121 is connected to a raw material container drive unit 125 for moving the raw material chamber bottom 121 to change the volume of the raw material chamber 120 when in operation.

The build unit 115 comprises a recipient 116 of variable volume configured to receive the portion of the raw material 22 from the raw material container 114. The build unit 115 comprises a recipient bottom 117 connected to a build unit drive unit 118 for moving the recipient bottom 117 to change the volume of the recipient 116 when in operation.

The raw material processing unit 110 comprises a housing for the raw material container unit 111, the build unit 115, and the raw material positioning unit 113. The housing is not shown in FIG. 6. Wheels can be provided on the underside of the housing for moving the raw material processing unit freely on a floor similar to the configuration of the third embodiment. The raw material processing unit 110 can be removably connectable to the energy generation unit 102 and freely movable in any direction when not connected to the energy generation unit 102 as described in EP 3533588 A1, the contents of which is incorporated for reference in its entirety.

The additive manufacturing device 100 is shown in a schematic view in section. The additive manufacturing device 100 can include a heat exchange unit 108, which can comprise a heat source for heating a raw material 122 provided in the recipient 116, such as described in EP 3310556 A1, the contents of which is incorporated for reference in its entirety. The solid article 123 is generated by an additive manufacturing method in the recipient 116. The additive manufacturing device 100 comprises an energy beam generation unit 103, in particular a diode laser generation unit. A raw material supply unit can be provided for supplying raw material to the raw material container 114 containing the raw material 122 to be used for manufacturing the solid article 123.

The raw material 122 has a raw material surface in the recipient 116 which corresponds to the surface 109 of the cover of the raw material processing unit 110. The raw material surface is exposed to an energy beam 105 emitted by the energy beam generation unit 103 when in operation. The energy beam 105 is directed onto the raw material surface. The raw material 22 is heated at the raw material surface in any location which is exposed to the energy beam 105. The energy beam 105 usually melts the raw material 122 at the raw material surface and the layer extending beneath the raw material surface, whereby a coherent sub-structure is formed. The coherent sub-structure at the portion of the raw material which is impinged by the energy beam 105 differs from the raw material, which is usually in a flowable state, which can be one of a powder or a liquid or any combination of liquid and powder such as a slurry. This coherent sub-structure solidifies as soon as the energy beam 105 is redirected onto another location or spot of the raw material surface of the uppermost layer in the recipient 116. The coherent sub-structure adheres also to any coherent sub-structure present below the uppermost layer of raw material 122, e.g., in a previously applied layer of raw material which had been exposed to the energy beam 105 in a preceding additive manufacturing process step.

The operation of the energy beam 105 can be controlled by a control unit 106. The energy beam generation unit 103 is disposed with a directing unit 104 to direct the energy beam 105 onto the raw material surface in the recipient 116 according to a computer-generated model of the solid article 123 stored in a storage unit 107 associated with the control unit 106. Thereby, the operation of the directing unit 104 is controlled by the control unit 106. The energy beam 105 generated by the energy beam generation unit 103 passes through the optional heat exchange unit 108, which can comprise a heating surface, onto the raw material surface. Thus, the energy beam 105 traverses the heating surface of the heat source. In particular, the heating surface is transparent for an energy beam, e.g., of a diode laser. Advantageously the heating surface is transparent for light of a wavelength in a range of 100 nm up to and including 1 mm.

The generation of a solid article 123 by an additive manufacturing method in the additive manufacturing device 100 involves the following steps. A portion of the raw material 122 stored in the raw material container 114 or is supplied as a layer of a thickness of less than 1 mm by the raw material positioning unit 113 to the recipient 116, thus forming the uppermost raw material layer. According to a preferred embodiment, the thickness or height of each of the raw material layers can be about 100 μm.

The raw material supply unit, which is not shown in FIG. 6, can include a raw material supply container, such as a hopper, which is filled with raw material. The raw material supply container can be movable or can be fixed.

The raw material container 114 includes a raw material container drive unit 125 for moving the raw material chamber bottom 121 of the raw material container 114 upwardly in a stepwise manner. Thereby the raw material 122 for a new layer of raw material to be supplied on top of the raw material surface in the recipient 116 is provided. For the generation of each new raw material layer, the raw material chamber bottom 121 of the raw material container 114 is moved upwardly in a stepwise manner, such that a portion of the raw material 122 of a volume corresponding to the thickness of a new raw material layer can be supplied to the recipient 116 of the build unit 115.

The raw material positioning unit 113 can be used to move the portion of the raw material 122 from the raw material container 114 to the recipient 116 of the build unit 115. The raw material chamber 120 of the raw material container 114 is shown in FIG. 6 in section. The front wall of the raw material chamber 120, and of the recipient 116 are omitted to show the interior of the raw material chamber 120, and the recipient 116. The raw material 122 is distributed on the surface of the first or previous raw material layer containing a portion of the solid article 123 for which the additive manufacturing method has already been completed.

The raw material positioning unit 113 comprises a raw material distribution unit 130, which can be configured as a roller element or as a sliding element or a combination thereof. The raw material distribution unit 130 can perform a sliding or rolling movement. The raw material distribution unit 130 thereby pushes the volume of raw material supplied for generation of the second or subsequent raw material layer to the build unit 115.

The recipient bottom 117 of the recipient 116 is also movable in a direction perpendicular to the surface 109. A build unit drive unit 118 is connected to the recipient bottom 117. In particular, the recipient bottom 117 is movable downwardly. Each new layer of each portion of the raw material 122 supplied from the raw material container 114 or the second raw material container 116 is deposited on the previous raw material layer and each of the raw material layers contains a portion of the solid article 123 to be manufactured after an additive manufacturing step has been performed on the previous raw material layer.

The raw material positioning unit 113 for the additive manufacturing device 100 for manufacturing a solid article comprises a raw material distribution unit 130, a guide unit 140 and a drive unit 141. The drive unit 141 is configured to move the raw material distribution unit 130 with respect to the guide unit 140. The raw material positioning unit 113 comprises a switch 150 for directing the raw material distribution unit 130 alternatively onto a first path 151 or a second path 152. The second path 152 is located below the first path 151. According to the embodiment of FIG. 6, the guide unit 140 comprises a guide rail. The raw material distribution unit 130 may be provided with a guide pin protruding into a corresponding cavity of the guide rail. The guide pin may perform a sliding movement in the guide rail. The guide pin may be coupled to a drive unit, which may be configured as a hydraulic or pneumatic drive unit. According to an embodiment, the guide rail may include a toothed rod for engagement of a gear coupled to the drive unit 141. The drive unit 141 may include a rotary engine.

The switch 150 may include a flexible portion of the guide unit 140. An actuation unit 153 may be provided for switching the flexible portion of the guide unit 140 between the first path 151 and the second path 152.

A raw material disposal unit 133 is configured for the reception of spent raw material 124. According to this embodiment, the raw material disposal unit 133 includes a recipient 136. The recipient 136 is arranged according to the second embodiment substantially adjacent to the raw material container 114 and can extend also below the recipient 116 of the build unit 115, what is not shown in FIG. 6. The recipient 136 is provided with an opening 134 arranged substantially at the same level as the surface 109. The opening 134 can be provided in the cover of the raw material processing unit 110 between the first raw material container unit 111 and the corresponding external side wall of the raw material processing unit 110. The side wall is not shown in the drawings. The opening 134 is configured to receive any spent raw material 124 from the recipient 116 of the build unit 115 and/or any superfluous raw material 122 from the raw material container 114. The raw material positioning unit 113 may be configured to move any raw material 122 and any spent raw material 124 to the opening 134. The raw material 122 and the spent raw material 124 fall through this opening and accumulate in a raw material disposal unit 133. The cover area of the raw material processing unit 110 can thus be cleaned from any raw material 122 or spent raw material 124 accidentally flowing out of the raw material container 114.

FIG. 6 shows the raw material processing unit 110 according to the second embodiment of the invention upon completion of an additive manufacturing step. Contemporaneously or subsequently, a raw material supply step is initiated to form a new layer of raw material 122 on top of the raw material layer(s) already present in the recipient 116 of the build unit 115. According to this embodiment, the raw material 122 is supplied from the raw material container 114 positioned on the left side of the build unit 115. The raw material chamber bottom 121 is lifted by actuation of the raw material container drive unit 125. According to this embodiment, the raw material chamber bottom 121 is lifted to provide a volume of raw material 122 which essentially corresponds to the volume of raw material 122 required to form an additional raw material layer in the recipient 116 of the build unit 115. The lifted raw material 122 thereby forms an elevation extending above the level of the cover of the raw material processing unit 110.

When the additive manufacturing step has just been completed, the recipient bottom 117 is lowered by actuation of the build unit drive unit 118 to provide the required space for an additional layer of raw material 122 placed on top of the raw material layers containing the portion of the solid article 123 in the recipient 116 of the build unit 115.

Figures 7, 8:
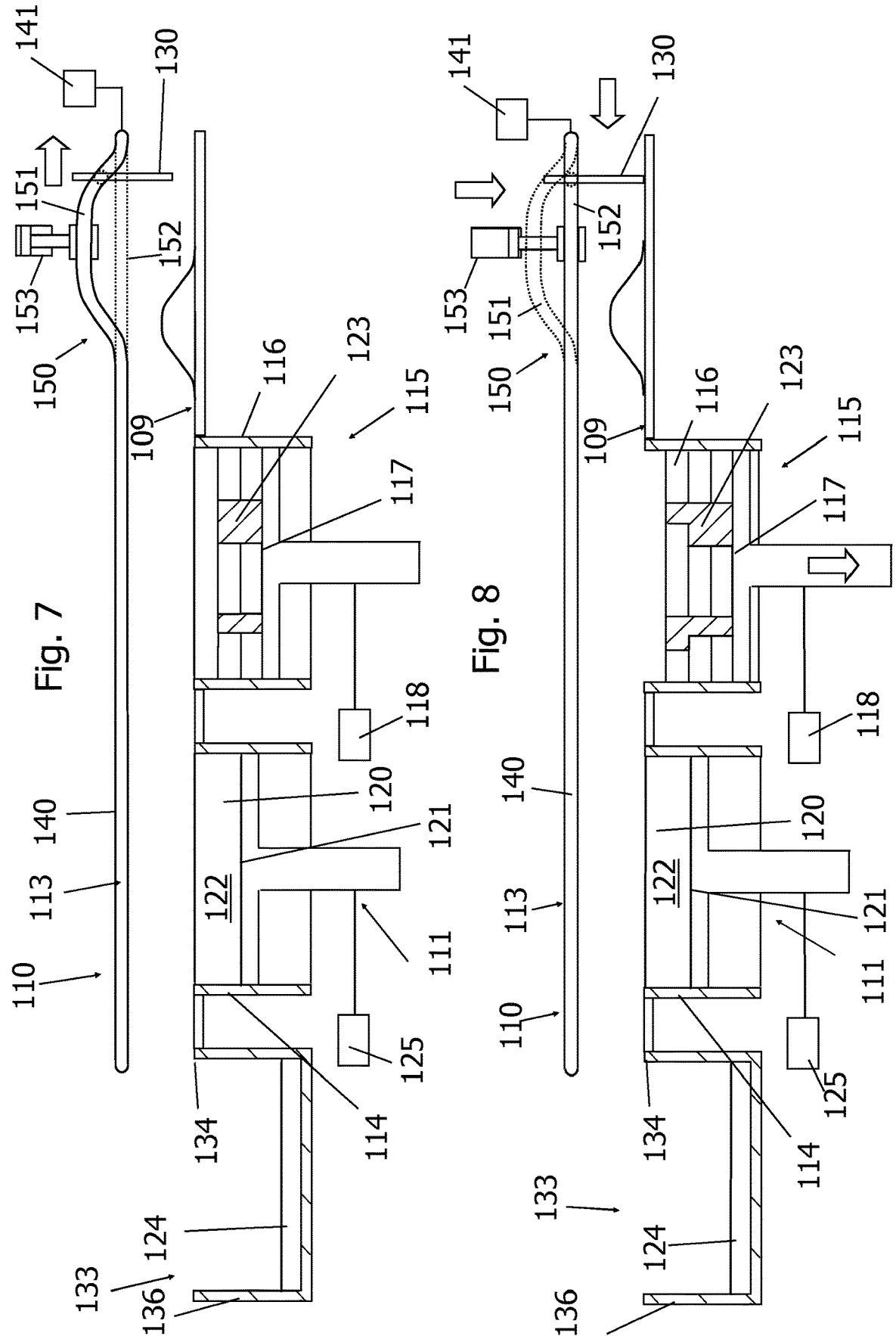

FIG. 7 shows the raw material processing unit 110 according to the second embodiment of the invention for the preparation of for a subsequent additive manufacturing step. In FIG. 7 it is shown that the raw material distribution unit 130 is actuated to perform a sliding movement in the guide unit 140. The guide unit 140 includes a first portion, which is straight and a second portion forming either the first path 151 or the second path 152. The raw material distribution unit 130 moves the raw material 122 present above the level of the surface 109 to the build unit 115. The raw material 122 drops in the space provided in the recipient 116. The raw material distribution unit 130 continues to move along its pathway in the direction of the second portion of the guide unit 140. At latest when the raw material distribution unit 130 has passed the build unit 115, the switch 150 is actuated by the actuation unit 153 to direct the raw material distribution unit 130 along the first path 151. The raw material distribution unit 130 still pushes any superfluous raw material in the direction of travel, in FIG. 7 to the right side. When the raw material distribution unit 130 reaches the second portion of the guide unit 140 forming the first path 151, the raw material distribution unit 130 is lifted and any superfluous raw material 122 is deposited on the surface 109. The first path 151 follows a curved line involving a first turn and a second turn. When the raw material distribution unit 130 reaches the first turn it is lifted, when it reaches the second turn it is lowered again to the position shown in FIG. 7. At the end of the first path 151, the raw material distribution unit 130 is located at substantially the same distance to the surface 109 as in the first portion of the guide unit 140.

FIG. 8 shows the raw material processing unit 110 according to the second embodiment of the invention during a subsequent raw material supply step. The additive manufacturing process step which is performed between the two subsequent raw material supply steps has been omitted as it is described in context with the first embodiment. Upon completion of the additive manufacturing process step the build unit drive unit 118 is actuated to lower the recipient bottom 117 as illustrated by the arrow pointing to the lower end of the drawing inside the actuation rod connected to the build unit drive unit 118. When the recipient bottom 117 has reached its rest position, the raw material 122 deposited on the surface 109 from the previous raw material supply step as shown in FIG. 7 can be transported into the space now available in the recipient 116.

The raw material supply step may be initiated at the same time as the additive manufacturing process step is completed or may be initiated at any point in time thereafter. The raw material supply step involves the actuation of the drive unit 141 to move the raw material distribution unit 130 from its end position into the direction of the build unit 115 and further to the raw material container unit 111 and even further towards the raw material disposal unit 133.

Before actuation of the drive unit 141 of the raw material processing unit 110, the actuation unit 153 is actuated to actuate the switch 150. The switch 150 is actuated to move the second portion of the guide unit 140 from the first path 151 to the second path 152. According to this embodiment, the second portion of the guide unit 140 is lowered so that it forms a straight line with the first portion of the guide unit 140.

The actuation of the drive unit 141 initiates the movement of the raw material distribution unit 130 from the second portion of the guide unit 140 to the first portion of the guide unit 140. The raw material distribution unit 130 pushes the raw material 122 deposited earlier on the surface 109 to the build unit 115. When the raw material 122 is moved to a position above the recipient 116, the space provided for the raw material 122 in the recipient 116 is filled with the raw material 122. Any superfluous raw material 122 is pushed further by the raw material distribution unit 130 over the first raw material container unit 111 towards the raw material disposal unit 133. The raw material disposal unit 133 comprises a recipient 136 for receiving the superfluous raw material 122 or the spent raw material 124. If the spent raw material 124 contains impurities or agglomerates, such spent raw material 124 may undergo a pre-treatment step before being reused for a further additive manufacturing process, which is described in more detail for the third embodiment.

When the raw material distribution unit 130 has reached the position shown in FIG. 6 again a new cycle of the additive manufacturing process to be completed by the additive manufacturing device 100 is initiated. The cycles are repeated until the entire solid article 123 is manufactured, i.e., until the total number of raw material layers required for the manufacture of the solid article 123 is reached.

Figure 9:
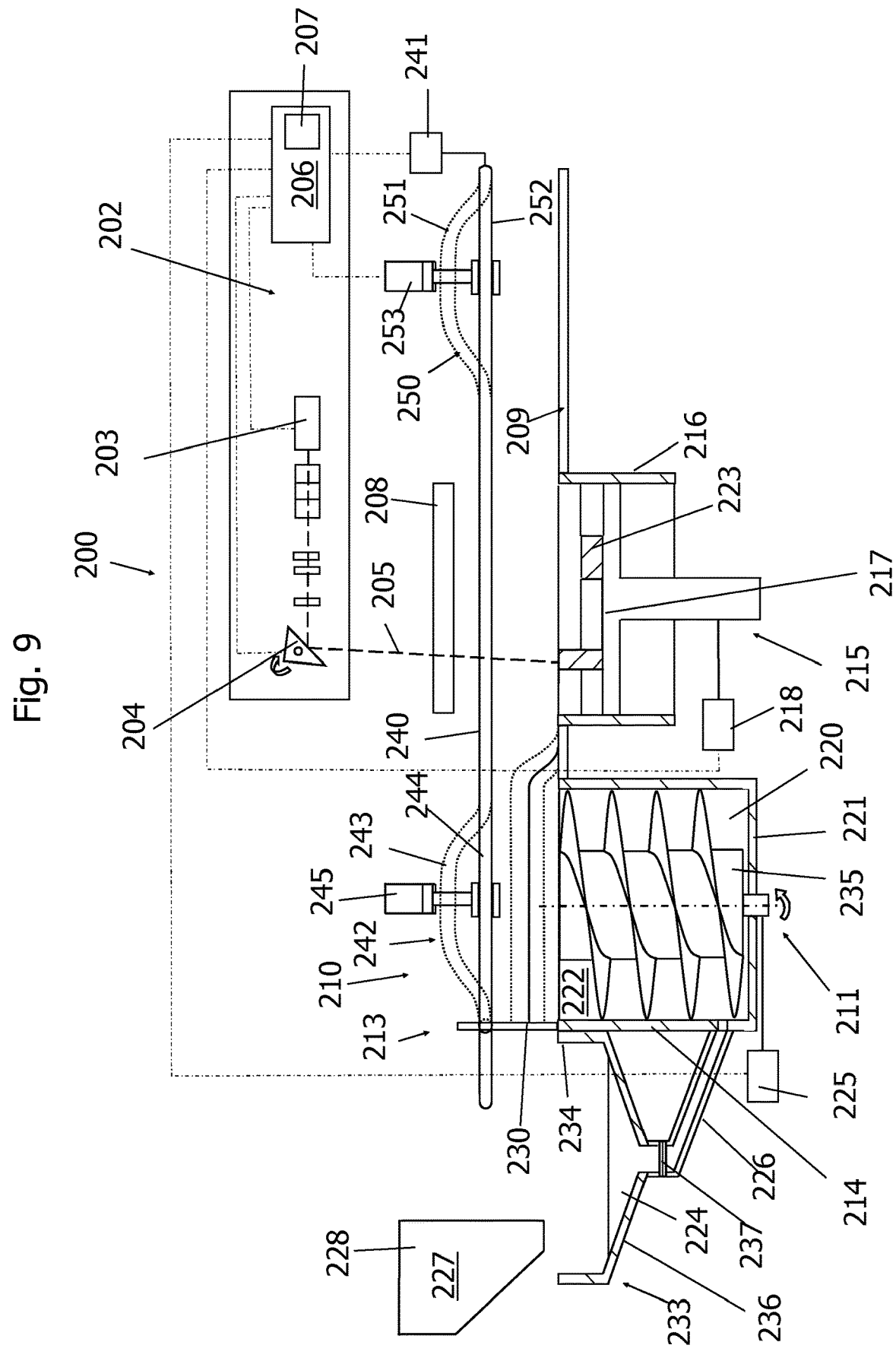

FIG. 9 shows a schematic section through an additive manufacturing device 200 according to a third embodiment of the invention including a raw material processing unit 210 for performing an additive manufacturing process. The additive manufacturing device 200 for manufacturing a solid article comprises an energy generation unit 202 and a raw material processing unit 210. The energy generation unit 202 comprises an energy beam generation unit 203. The raw material processing unit 210 comprises a raw material container unit 211, a build unit 215, and a raw material positioning unit 213. The raw material container unit 211 comprises a raw material container 214 containing a raw material 222 for the manufacture of a solid article 223.

The build unit 215 is configured to receive the raw material 222 from the raw material container 214. The raw material positioning unit 213 is configured to transport a portion of the raw material 222 from the raw material container unit 211 to the build unit 215. The raw material container 214 comprises a raw material chamber 220. The raw material chamber 220 comprises a raw material chamber bottom 221, which is according to this embodiment not movable. The raw material chamber bottom 221 is disposed with a conveyor element 235. The conveyor element 235 is rotatably supported in the raw material chamber bottom 221. The conveyor element 235 can be rotated by a conveyer element drive unit 225 for rotating the conveyor element 235 to transport the raw material 222 from a raw material supply conduit 226 through the raw material chamber 220 to supply the raw material 222 when in operation.

The raw material 222 can in particularly provided continuously by the conveyor element 235, therefore three different possible surface levels for the raw material 222 are indicated in FIG. 9. In FIG. 9 an intermediate level of the raw material 222 is depicted, which corresponds to the stage of the additive manufacturing process step which can be performed according to this embodiment contemporaneously to the raw material supply step. When the additive manufacturing process step shown in FIG. 9 is terminated, the raw material 222 has reached the highest level, shown in dotted lines in FIG. 9.

The build unit 215 comprises a recipient 216 of variable volume configured to receive a portion of the raw material 222 from the raw material container 214. The build unit 215 comprises a recipient bottom 217 connected to a build unit drive unit 218 for moving the recipient bottom 217 to change the volume of the recipient 216 when in operation.

The raw material processing unit 210 comprises a housing for the raw material container unit 211, the build unit 215, and the raw material positioning unit 213. The housing is omitted in FIG. 6. Wheels can be provided on the underside of the housing for moving the raw material processing unit 210 freely on a floor. The raw material processing unit 210 can be removably connectable to the energy generation unit 202 and freely movable in any direction when not connected to the energy generation unit 202 as described in EP 3533588 A1, the contents of which is incorporated for reference in its entirety.

The additive manufacturing device 200 is shown in a schematic view in section. The additive manufacturing device 200 can include a heat exchange unit 208, which can comprise a heat source for heating a raw material 222 provided in the recipient 216, such as described in EP 3310556 A1, the contents of which is incorporated for reference in its entirety. The solid article 223 is generated by an additive manufacturing method in the recipient 216. The additive manufacturing device 100 comprises an energy beam generation unit 203, in particular a diode laser generation unit. A raw material supply unit 227 can be provided for supplying raw material to the raw material container 214 containing the raw material 222 to be used for manufacturing the solid article 223.

The raw material 222 has a raw material surface which is coplanar to the surface 209 of the raw material processing unit. The raw material surface is exposed to an energy beam 205 emitted by the energy beam generation unit 203 when in operation. The energy beam 205 is directed onto the raw material surface. The raw material 222 is heated at the raw material surface in any location which is exposed to the energy beam 205. The energy beam 205 usually melts the raw material 222 at the raw material surface and the layer extending beneath the raw material surface, whereby a coherent sub-structure is formed. The coherent sub-structure at the portion of the raw material in the recipient 216 which is impinged by the energy beam 205 differs from the raw material in that it is solidified. The raw material 222 is usually in a flowable state, which can be one of a powder or a liquid or any combination of liquid and powder such as a slurry. This coherent sub-structure solidifies as soon as the energy beam 205 is redirected onto another location or spot of the raw material surface. The coherent sub-structure adheres also to any coherent sub-structure present in the raw material layer below the uppermost raw material layer forming the raw material surface, e.g., in a previously applied layer of raw material which had been exposed to the energy beam 205 in a previous additive manufacturing process step.

The operation of the energy beam 205 can be controlled by a control unit 206. The energy beam generation unit 203 is disposed with a directing unit 204 to direct the energy beam 205 onto the raw material in the recipient forming a portion of the surface 209 according to a computer-generated model of the solid article 223 stored in a storage unit 207 associated with the control unit 206. Thereby, the operation of the directing unit 204 is controlled by the control unit 206. The energy beam 205 generated by the energy beam generation unit 203 passes through the optional heat exchange unit 208, which can comprise a heating surface, onto the raw material surface in the recipient 216. Thus, the energy beam 205 traverses the heating surface of the heat source.

In particular, the heating surface is transparent for an energy beam, e.g., of a diode laser. Advantageously the heating surface is transparent for light of a wavelength in a range of 100 nm up to and including 1 mm.

The generation of a solid article 223 by an additive manufacturing method in the additive manufacturing device 200 involves the following steps. A portion of the raw material 222 stored in the raw material container 214 or is supplied as a raw material layer of a thickness of less than 1 mm by the raw material positioning unit 213 to the recipient 216. According to a preferred embodiment, the thickness or height of the layer can be about 100 μm.

The raw material supply unit 226 can include a raw material supply container 228, such as a hopper, which is filled with raw material. The raw material supply container 228 can be movable or can be fixed.

The raw material positioning unit 213 can be used to move a portion of the raw material 222 supplied from the raw material container 214 to the recipient 216 of the build unit 215. The raw material chamber 220 of the raw material container 214 is shown in FIG. 9 in section. The front wall of the raw material chamber 220, and of the recipient 216 are omitted to show the interior of the raw material chamber 220, and the recipient 216. The raw material 222 is distributed on the surface of the first or previous layer for which the additive manufacturing method has already been completed.

The raw material positioning unit 213 comprises a raw material distribution unit 230, which can be configured as a roller element or as a sliding element or a combination thereof. The raw material distribution unit 230 can perform a sliding or rolling movement. The raw material distribution unit 230 thereby pushes the volume of raw material supplied for generation of the second or subsequent layer to the build unit 215 as well as the additional raw material 222 for generation of an additional layer to be placed on top of the second or subsequent layer after completion of the additive manufacturing step for the second or subsequent layer.

The recipient bottom 217 of the recipient 216 is also movable in a direction perpendicular to the raw material surface. A build unit drive unit 218 is connected to the recipient bottom 217. In particular, the recipient bottom 217 is movable downwardly. Each new layer of each portion of the raw material 222 supplied from the raw material container 214 or the second raw material container 216 is deposited on the previous raw material layer. Each of the raw material layers contains a portion of the solid article 223 after the respective additive manufacturing step has been performed on the previous raw material layer.

The raw material positioning unit 213 for the additive manufacturing device 200 for manufacturing a solid article comprises a raw material distribution unit 230, a guide unit 240 and a drive unit 241. The drive unit 241 is configured to move the raw material distribution unit 230 with respect to the guide unit 240. As in the previous embodiments, the raw material positioning unit 213 comprises a switch 250 for directing the raw material distribution unit 230 alternatively onto a first path 251 or a second path 252. The second path 252 is located below the first path 251.

The guide unit 240 comprises an additional switch 242 for directing the raw material distribution unit 230 alternatively onto a third path 243 or a fourth path 244. The fourth path 244 is located below the third path 243.

According to the embodiment of FIG. 9 the guide unit 240 comprises a guide rail. The raw material distribution unit 230 may be provided with a guide pin protruding into a corresponding cavity of the guide rail. The guide pin may perform a sliding movement in the guide rail. The guide pin may be coupled to a drive unit, which may be configured as a hydraulic or pneumatic drive unit. According to an embodiment, the guide rail may include a toothed rod for engagement of a gear coupled to the drive unit 241. The drive unit 241 may include a rotary engine.

The switch 250 and the additional switch 242 each may include a flexible portion of the guide unit 240. An actuation unit 253 may be provided for switching the flexible portion of the guide unit 240 between the first path 251 and the second path 252. An additional actuation unit 245 may be provided for switching the flexible portion of the guide unit 240 between the third path 243 and the fourth path 244.

A raw material supply and disposal unit 233 is configured for the provision of raw material 222 from the raw material supply unit 227 and for the reception of spent raw material 224. According to this embodiment, the raw material supply and disposal unit 233 includes a recipient 236. The recipient 236 is arranged substantially adjacent to the raw material container 214. The recipient 236 is provided with an opening 234 arranged substantially at the same level as the surface 209. The opening 234 can be provided in the cover of the raw material processing unit 210 between the first raw material container unit 211 and the corresponding external side wall of the raw material processing unit 210. The side wall is not shown in the drawings. The opening 234 is configured to receive any spent raw material 224 from the recipient 216 of the build unit 215 and/or any superfluous raw material 222 from the raw material container 214 and/or any raw material form the raw material supply unit 227.

The raw material positioning unit 213 may be configured to move any raw material 222 and any spent raw material 224 to the opening 234. The raw material 222 and the spent raw material 224 fall through this opening and accumulate the recipient 236. The cover area of the raw material processing unit 210 can thus be cleaned from any raw material 222 flowing out of the raw material container 214 or any spent raw material 224. The raw material 222 and the spent raw material 224 may be mixed and the spent raw material 224 may be recycled. Before any spent raw material 224 is supplied to the raw material chamber 220 of the raw material container unit 211, such spent raw material 224 can be subjected to a pre-treatment step. Such a pre-treatment step may be required to identify and eliminate any agglomerates in particular in the spent raw material 224. A sieve 237 for the separation of agglomerates from the raw material 222 or the spent raw material 224 may be provided downstream of the recipient 236, in particular in the raw material supply conduit 226.

FIG. 9 shows the raw material processing unit 210 according to the third embodiment of the invention at a point in time at which the additive manufacturing step is not yet completed. The raw material supply has already been initiated to form a new layer of raw material 222 on top of the layer(s) already present in the recipient 216 of the build unit 215. According to this embodiment, the raw material 222 is supplied from the raw material container 214 positioned on the left side of the build unit 215. The conveyer element 235 continuously supplies the raw material 222. The conveyor element 235 is operated by the conveyor element drive unit 225. According to this embodiment, the conveyor element comprises a screw which is rotatably supported in the raw material chamber bottom 221. A volume of raw material 222 which essentially corresponds to the volume of raw material 222 required to form two additional layers in the recipient 216 of the build unit 215 is provided by the conveyor element 235. The provided raw material 222 forms an elevation extending above the surface 209, corresponding to the level of the cover of the raw material processing unit 210. In FIG. 9, three different elevation levels are shown.

When the additive manufacturing step has just been completed, the recipient bottom 217 is lowered by actuation of the build unit drive unit 218 to provide the required space for an additional layer of raw material 222 placed on top of the layers of raw material and the portion of the solid article 223 in the recipient 216 of the build unit 215.

Figures 10, 11:
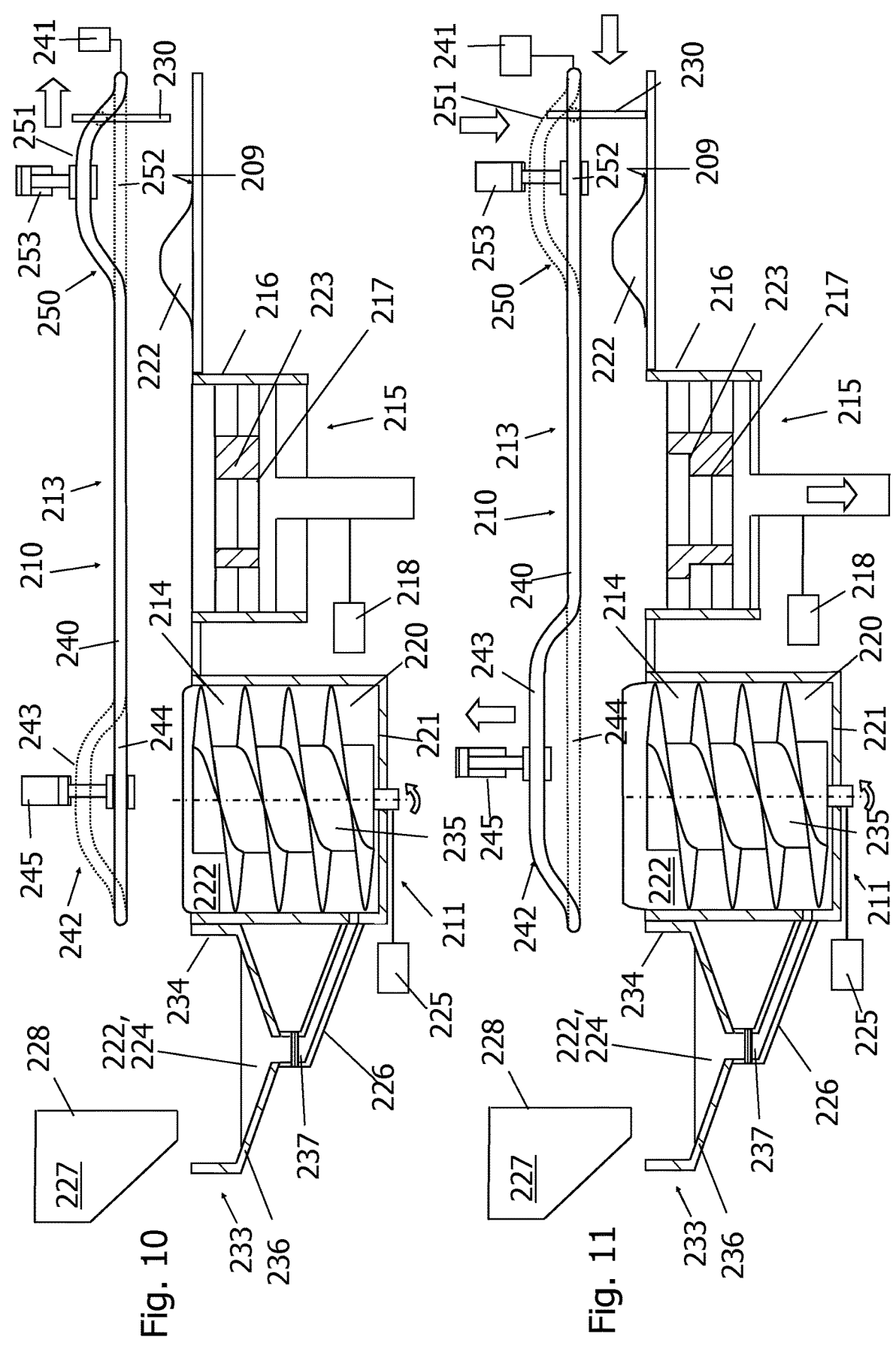

FIG. 10 shows the raw material processing unit 210 according to the third embodiment of the invention for the preparation of for a subsequent additive manufacturing step. In FIG. 10 it is shown that the raw material distribution unit 230 is actuated to perform a sliding movement in the guide unit 240. The guide unit 240 includes a first portion forming either the third path 243 or the fourth path 244, a second portion, which is straight and a third portion forming either the first path 251 or the second path 252. The raw material distribution unit 230 moves the raw material 222 present above the level of the surface 209 to the build unit 215. The additional switch 242 is actuated by the additional actuation unit 245 to direct the raw material distribution unit 230 along the fourth path 244. The raw material distribution unit 230 pushes the raw material 222 deposited on the surface 209 towards the recipient 216. A portion of the raw material 222 drops in the space provided in the recipient 216. The raw material distribution unit 230 continues to move along the second portion of the pathway provided by the guide unit 240 in the direction of the third portion of the guide unit 240. At latest when the raw material distribution unit 230 has passed the build unit 215, the first switch 250 is actuated by the actuation unit 253 to direct the raw material distribution unit 230 along the first path 251. The raw material distribution unit 230 still pushes the remaining raw material 222 in the direction of travel, in FIG. 10 to the right side. When the raw material distribution unit 230 reaches the third portion of the guide unit 240 forming the first path 251, the raw material distribution unit 230 is lifted and any superfluous raw material 222 is deposited on the surface 209. The first path 251 follows a curved line involving a first turn and a second turn. When the raw material distribution unit 230 reaches the first turn it is lifted, when it reaches the second turn it is lowered again as shown in FIG. 10. At the end of the first path 251, the raw material distribution unit 230 is located at substantially the same distance to the surface 209 as in the first portion of the guide unit 240. The remaining raw material 222 is deposited on the surface 209.

FIG. 11 shows the raw material processing unit 210 according to the third embodiment of the invention during a subsequent raw material supply step. The additive manufacturing process step which is performed between the two subsequent raw material supply steps has been omitted as it is described in context with the first embodiment. Upon completion of the additive manufacturing process step the build unit drive unit 218 is actuated to lower the recipient bottom 217 as illustrated by the arrow pointing to the lower end of the drawing inside the actuation rod connected to the build unit drive unit 218. When the recipient bottom 217 has reached its rest position, the raw material 222 deposited on the surface 209 from the previous raw material supply step as shown in FIG. 10 can be transported into the space now available in the recipient 216.

Before actuation of the drive unit 241 of the raw material processing unit 210, the actuation unit 253 is actuated to actuate the switch 250. The switch 250 is actuated to move the third portion of the guide unit 240 from the first path 251 to the second path 252. According to this embodiment, the third portion of the guide unit 240 is lowered so that it forms a straight line with the second portion of the guide unit 240.

The actuation of the drive unit 241 initiates the movement of the raw material distribution unit 230 from the third portion of the guide unit 240 to the second portion of the guide unit 240. The raw material distribution unit 230 pushes the raw material 222 deposited earlier over the surface 209 to the build unit 215. When the raw material 222 is moved to a position above the recipient 216, the space provided for the raw material 222 in the recipient 216 is filled with the raw material 222. Any superfluous raw material 222 is pushed further by the raw material distribution unit 230 towards the first raw material container unit 211. At this stage, an inspection may be performed by an inspection unit to check if any agglomerates are present in any superfluous raw material 222. In case any agglomerates are detected, the additional switch 242 is actuated by the additional actuation unit 245 to direct the raw material distribution unit 230 along the fourth path 244. The superfluous raw material and the raw material 222 provided in the meantime by the conveyor element 235 of the raw material container unit 211 are pushed by the raw material distribution unit 230 further to the raw material supply and disposal unit 233. The raw material supply and disposal unit 233 comprises a recipient 236 for receiving the raw material 222 and optionally any spent raw material 224. If the spent raw material 224 contains impurities or agglomerates, such spent raw material 224 may undergo a pre-treatment step before being reused for a further additive manufacturing process. Any agglomerates or impurities in the spent raw material 224 can be separated from the raw material 222 in the raw material supply and disposal unit 233. A sieve 237 is shown as an exemplary separation element in FIGS. 9 to 11. Other suitable separation elements may be provided, e.g., a fluid bed or a vibration element.

The raw material supply step may be initiated at the same time as the additive manufacturing process step is completed or may be initiated at any point in time thereafter. The raw material supply step involves the actuation of the drive unit 241 to move the raw material distribution unit 230 from its end position into the direction of the build unit 215 and further to the raw material container unit 211 and optionally even further towards the raw material disposal unit 233.

The conveyer element 235 may be operated continuously to provide raw material 222 for a subsequent additive manufacturing step. In FIG. 10 and in FIG. 11, different elevations of raw material 222 with respect to the surface 209 are illustrated. The raw material distribution unit 230 continues on its path from the third portion of the guide unit to the second portion of the guide unit 240. After having passed the second portion, the raw material distribution unit

230 is positioned between the build unit 215 and the raw material container unit 211. If no spent raw material containing any agglomerates is detected by the inspection unit, the additional switch 242 is actuated by the additional actuation unit 245 to direct the raw material distribution unit 230 along the third path 243. The raw material distribution unit 230 does not come into contact with the raw material 222 provided by the conveyor element 235 from the raw material container 220. According to the third embodiment, the raw material supply process needs not to be interrupted. According to the third embodiment, it is therefore possible to supply the raw material continuously. Thereby, the time period between two subsequent additive manufacturing process steps can be minimized and the time to complete the additive manufacturing process for manufacturing the solid article 223 can be further reduced.

When the raw material distribution unit 230 has reached the position shown in FIG. 9 again a new cycle is initiated. The cycles are repeated until the entire solid article 223 is manufactured, i.e., until the total number of raw material layers required for the manufacture of the solid article 223 is reached.

Figures 12A, 12B, 12C:
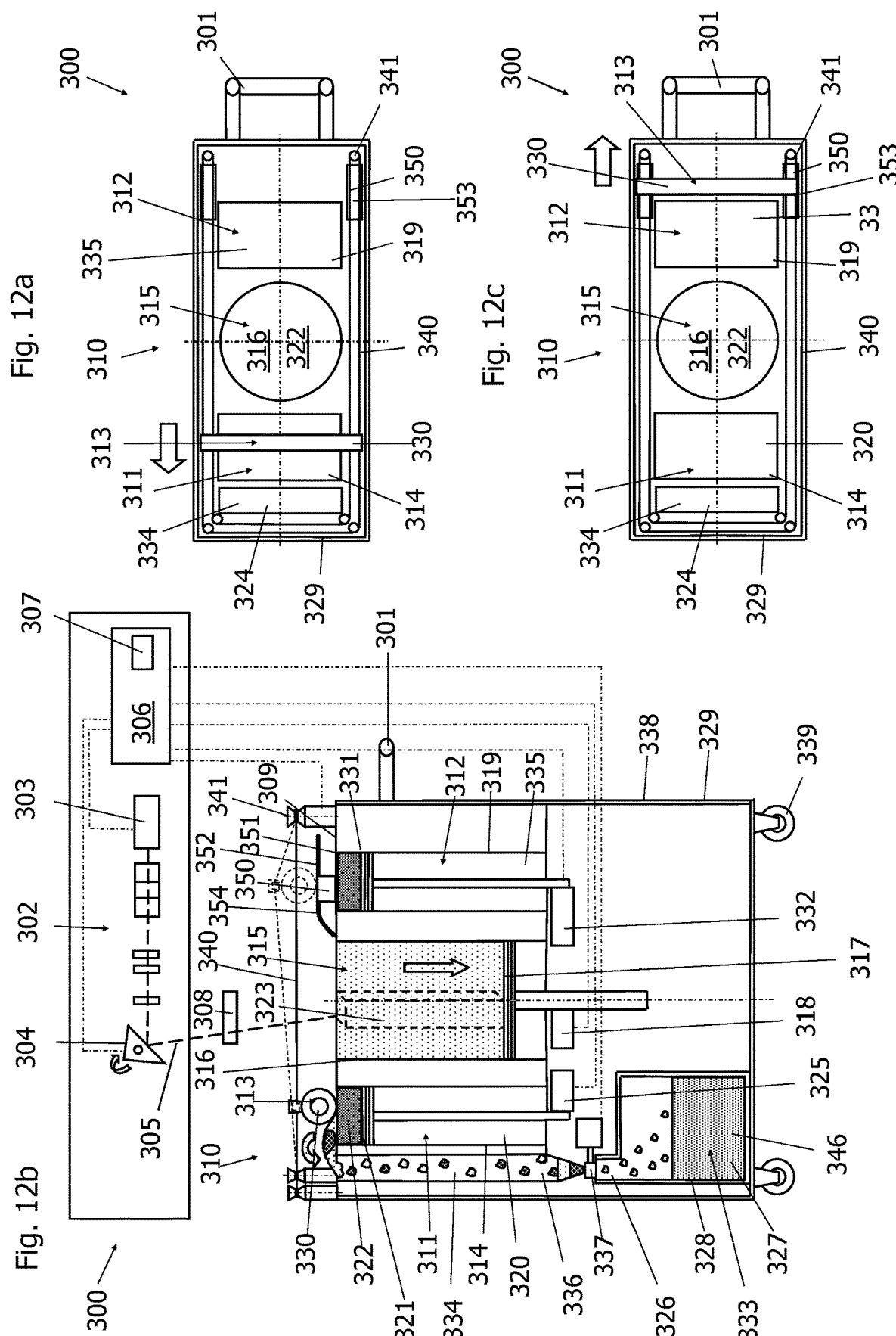

FIG. 12a shows a top view on a raw material processing unit 310 according to a fourth embodiment of an additive manufacturing device 300. The raw material processing unit 310 comprises a first raw material container unit 311, a build unit 315 of circular cross-section, a second raw material container unit 312 and a raw material positioning unit 313. The first raw material container unit 311 comprises a first raw material container 314 of rectangular cross-section. The second raw material container unit 312 comprises a second raw material container 319 of rectangular cross-section. The build unit 315 comprises a recipient 316 of circular cross-section. By providing a first and second material container 314, 319 or alternatively or additionally also a recipient 316 of a rectangular cross-section, a substantial amount of space can be saved. A raw material processing unit 310 containing at least one of the build units 315 or the first and second raw material container 314, 319 of rectangular cross-section is therefore more compact than the prior art variants containing only raw material containers and build units of circular cross-section. Furthermore, a recipient 336 configured as a supply or spent raw material container can be provided between the first raw material container 314 and a housing 329 of the raw material processing unit 310. Alternatively or additionally, the recipient 336 can comprise an opening 334 for receiving the raw material 322 or the spent raw material. The opening 334 can be provided in the cover portion of the housing of the raw material processing unit 310 between the first raw material container unit 311 and the corresponding side wall of the housing. The recipient 336 is thus configured to receive any spent raw material 324 from the recipient 316 of the build unit 315 and/or any superfluous raw material 322 from one of the first or second raw material containers 314, 319.

The raw material positioning unit 313 may be configured to move any raw material 322 and any spent raw material 324 to the supply or spent raw material container 334. The raw material 322 and the spent raw material 324 fall through this opening and accumulate in a raw material supply and disposal unit 333. The cover portion of the housing 329 of the raw material processing unit 310 can thus be cleaned from any raw material 322 or spent raw material 324 accidentally flowing out of any of the first or second raw material containers 314, 319. The raw material positioning unit 313 comprises a raw material distribution unit 330, a guide unit 340 and a drive unit 341. The raw material positioning unit 313 is configured to move the raw material distribution unit 330 with respect to the guide unit 340. The guide unit 340 comprises a switch 350 for directing the raw material distribution unit 330 alternatively onto a first path 351 or a second path 352, as shown in FIG. 12b. FIG. 12a shows the raw material distribution unit 330 in a first position, after having completed the supply of the raw material 322 from the second raw material container unit 312 to the build unit 315. This raw material distribution unit position substantially corresponds to the position of the raw material distribution unit 330 in FIG. 12b. A new additive manufacturing method step can be performed. FIG. 12c shows the raw material distribution unit 330 in a second position, after having completed the supply of raw material 322 from the first raw material container unit 311 to the build unit 315. This raw material distribution unit position substantially corresponds to the alternative position of the raw material distribution unit 330 shown in dashed lines in FIG. 12b.

FIG. 12b shows a section through an additive manufacturing device 300 including a raw material processing unit 310 of FIG. 12a showing the manufacture of a solid article 323. The additive manufacturing device 300 can include a heat exchange unit 308, which can comprise a heat source for heating a raw material 322 provided in the recipient 316. The additive manufacturing device 300 comprises an energy generation unit 302 including an energy beam generation unit 303, in particular a diode laser generation unit. The raw material 322 has a raw material surface exposed to an energy beam 305 emitted by the energy beam generation unit 303 when in operation. The energy beam 305 is directed onto the raw material surface. The raw material 322 is heated at the raw material surface in any location which is exposed to the energy beam 305. The energy beam 305 usually melts the raw material 322 at the raw material surface whereby a coherent sub-structure is formed. The coherent sub-structure at the portion of the raw material which is impinged by the energy beam 305 differs from the raw material, which is usually in a flowable state, which can be one of a powder or a liquid or any combination of liquid and powder such as a slurry. This coherent sub-structure solidifies as soon as the energy beam 305 is redirected onto another location or spot of the raw material surface. The coherent sub-structure adheres also to any coherent substructure present below the raw material surface, e.g., in a previously applied layer of raw material which had been exposed to the energy beam 305 in a previous process sequence.

The operation of the energy beam 305 is controlled by a control unit 306. The energy beam generation unit is disposed with a directing unit 304 to direct the energy beam 305 onto the raw material surface according to a computer-generated model of the solid article 323 stored in a storage unit 307 associated with the control unit 306. Thereby, the operation of the directing unit 304 is controlled by the control unit 306. The energy beam 305 generated by the energy beam generation unit passes through or next to the heat exchange unit 308, which can comprise a heating surface, onto the raw material surface. According to an embodiment, the energy beam 305 traverses the heating surface of the heat source. In particular, the heating surface is transparent for an energy beam e.g., of a diode laser. Advantageously the heating surface is transparent for light of a wavelength in a range of 100 nm up to and including 1 mm. A portion of the raw material 322 stored in the first or second raw material container 314, 319 is supplied as a layer of a thickness of less than 1 mm by the raw material positioning unit 313 to the recipient 316. According to a preferred embodiment, the thickness or height of the layer can be about 100 μm.

The heat exchange unit 308 can comprise a heat source, which can include a heating surface to provide thermal energy to the raw material surface to form a pre-heated raw material surface. The heat source can be of a circular or rectangular cross-section in particular corresponding to the cross-section of the recipient 316 of the build unit 315. The recipient 316 can also be of circular or rectangular cross-section. The heat source can contain an annular heating surface or a heating surface of rectangular cross-section. The heating surface can be transparent to the energy beam 305, such that the energy beam 305 can pass through the heating surface. The heating surface can contain at least one of a radiation heater or a resistance heater. The energy beam 305 generated and emitted by the energy beam generation unit is directed by the directing unit onto the pre-heated raw material surface.

The heat exchange unit 308 can be configured as a temperature homogenization box comprising a wall which delimits a channel such that the channel is laterally at least partially enclosed by the wall. The wall has a first wall edge and a second wall edge, whereby in the operative state, the second wall edge is configured to face the raw material surface of the raw material 322 contained in the recipient 316 of the build unit 315. The temperature homogenization box is attachable to the housing of the energy generation unit 302. The housing of the energy generation unit 302 is omitted from FIG. 12b. The housing can comprise a door. The door can form one of the side walls of the housing or the ceiling or can comprise a portion of the side walls or the ceiling. The housing can have substantially cubical shape.

The raw material processing unit 310 comprises a first raw material container unit 311, a second raw material container unit 312, a build unit 315 and a raw material positioning unit 313. The first raw material container unit 311 comprises a first raw material container 314 containing a raw material 322 or recycled raw material for the manufacture of a solid article 323. The second raw material container unit 312 comprises a second raw material container 319 also containing raw material 322 for the manufacture of a solid article 323.

The build unit 315 is configured to receive the raw material 322 from the first raw material container 314 or the second raw material container 319. The raw material positioning unit 313 is configured to transport a portion of the raw material 322 from the first raw material container 314 or the second raw material container 319 to the build unit 315. The first raw material container 314 comprises a first raw material chamber 320 of variable volume. The first raw material chamber 320 comprises a first raw material chamber bottom 321. The first raw material chamber bottom 321 is connected to a first raw material container drive unit 325 for moving the first raw material chamber bottom 321 to change the volume of the first raw material chamber 320 when in operation. The second raw material container 319 comprises a second raw material chamber 335 of variable volume, wherein the second raw material chamber 335 comprises a second raw material chamber bottom 331. The second raw material chamber bottom 331 is connected to a second raw material container drive unit 332 for moving the second raw material chamber bottom 331 to change the volume of the second raw material chamber 335 when in operation.

The build unit 315 comprises a recipient 316 of variable volume configured to receive the portion of the raw material 322 from the first raw material container 314 or from the second raw material container 319. The build unit 315 comprises a recipient bottom 317 connected to a build unit drive unit 318 for moving the recipient bottom 317 to change the volume of the recipient 316 when in operation.

The raw material processing unit 310 comprises a housing 329 for the first raw material container unit 311, the build unit 315, the second raw material container unit 312 and the raw material positioning unit 313. Wheels 339 can be provided on the underside of the housing 329 for moving the raw material processing unit 310 freely on a floor. The raw material processing unit 310 can be removably connectable to the energy generation unit and freely movable in any direction when not connected to the energy generation unit as described in EP 3533588 A1, the contents of which is incorporated for reference in its entirety.

According to this embodiment, the housing 329 includes a circumferential wall 338. The circumferential wall 338 comprises a wall edge, whereby the wall edge can comprise an engagement mechanism for connection with an energy generation unit of the additive manufacturing device for manufacturing a solid article. The engagement mechanism can comprise one of a hook, a groove, a snap-fit mechanism.

The raw material processing unit 310 can further comprise a manipulation element 301, such as a handle for moving the raw material processing unit 310 on the shop floor to any desired location.

The raw material processing unit 310 can also comprise a level adjustment mechanism. The level adjustment mechanism can be used to adjust the raw material processing unit 310 in height, such that, when the raw material processing unit 310 and the energy generation unit are connected, a sealing effect is obtained to prevent heat and/or raw material loss when performing an additive manufacturing method.

The raw material 322 has a raw material surface coplanar to the surface 309 exposed to an energy beam emitted by the energy beam generation unit when in operation as described in the previous embodiments. A raw material supply unit can be provided which can include a raw material supply container, such as a hopper, which is filled with raw material. The raw material supply container can be movable or can be fixed. A raw material supply unit 327 can also be located in the housing and can be removed therefrom to be arranged above at least one of the first or second raw material container units 311, 312 to refill these as needed. The raw material supply unit 327 can also include the raw material supply and/or disposal unit 333 described above. The raw material supply unit 327 can be filled with recycled raw material or a mixture of spent raw material 324 and raw material 322. The raw material supply unit 327 is connectable to the supply or spent raw material container 334 by a raw material supply conduit 326. A homogenization or separation device 337 may be arranged between the supply or spent raw material container 334 and the raw material supply unit 327. In particular, the homogenization or separation device 337 may include one of a sieve, a vibration element, a fluid bed.

After the manufacture of the solid article 323 is completed, the solid article 323 is removed from the recipient 316 and the solid article 323 is separated from the spent raw material 324 in the recipient 316. The spent raw material 324—which has remained in the recipient 316 after the extraction of the solid article 323 therefrom—is transferred from the recipient 316 to at least one of the first or second raw material containers 314, 319 or to the raw material supply and/or disposal unit 333 by the raw material positioning unit 313. The raw material supply and/or disposal unit 333 can include a pre-treatment step for the raw material 322 and the spent raw material 324 contained in the recipient 336, e.g., by the configuration of the supply or spent raw material container 334 and the raw material supply unit 327 including the homogenization or separation device 337.

The mixed raw material 346 can be supplied by the raw material supply unit 327 for the manufacture of a further solid article in a subsequent additive manufacturing method to the first and/or second raw material container 314, 319. A layer of raw material 322 can be added on top of the spent raw material 324 in the first or second raw material container 314, 319, thereby providing an alternating sequence of the raw material 322 and the spent raw material 324 to the build unit 315. The spent raw material 324 is mixed with the raw material 322 and thereby the spent raw material 324 can be recycled. In addition thereto, the mixed raw material 346, which is a mixture of new and spent raw material from the or a plurality of previous manufacturing processes, can be supplied to the first or second raw material containers 314, 319.

The first raw material container 314 includes a first raw material container drive unit 325 for moving the first raw material chamber bottom 321 of the first raw material container 314 upwardly in a stepwise manner. Thereby, the raw material 322 is provided for the supply of a new layer of raw material on top of the surface 309. For the generation of each new raw material layer, the first raw material chamber bottom 321 of the first raw material container 314 is moved upwardly in a stepwise manner, such that a portion of the raw material 322 of a volume corresponding to the thickness of a new raw material layer is supplied to the recipient 316 of the build unit 315.

The second raw material container 319 includes a second raw material container drive unit 332 for moving the second raw material chamber bottom 331 of the second raw material container 319 upwardly in a stepwise manner. Thereby, the raw material 322 is provided for the supply of a new layer of raw material on top of the raw material surface. For the generation of each new raw material layer, the second raw material chamber bottom 331 of the second raw material container 319 is moved upwardly in a stepwise manner, such that a portion of the raw material 322 of a volume corresponding to the thickness of a new raw material layer is supplied to the recipient 316 of the build unit 315.

The raw material positioning unit 313 can be used to move the portion of the raw material 322 either from the first raw material container 314 or from the second raw material container 319 to the recipient 316 of the build unit 315. The first raw material chamber 320 of the first raw material container 314 is shown in FIG. 12b in section. The second raw material chamber 335 of the second raw material container 319 is shown in FIG. 12b in section. The front wall of the first raw material chamber 320, the second raw material chamber 335, as well as of the recipient 316 are omitted to show the interior of the first raw material chamber 320, the second raw material chamber 335 and the recipient 316.

The raw material 322 is distributed on the surface of the first or previous layer for which the additive manufacturing method step has already been completed. In particular, subsequent layers may be provided alternatively from the first raw material container 314 or the second raw material container 319.

The raw material positioning unit 313 comprises a raw material distribution unit 330, which can be configured as a roller element or as a sliding element or a combination thereof. The raw material distribution unit 330 can perform a sliding or rolling movement. The raw material distribution unit 330 thereby pushes the volume of raw material supplied for the generation of the second or subsequent raw material layer to the build unit 315.

The recipient bottom 317 of the recipient 316 is also movable in a direction perpendicular to the raw material surface. A build unit drive unit 318 is connected to the recipient bottom 317. In particular, the recipient bottom 317 is movable downwardly as shown by the arrow in the recipient 316. Each new layer of each portion of the raw material 322 supplied from the first raw material container 314 or the second raw material container 316 is deposited on the previous raw material layer. Each of the raw material layers contains a portion of the solid article 323 to be manufactured after an additive manufacturing step has been performed on the previous raw material layer.

Figures 15, 16A, 16B, 17:
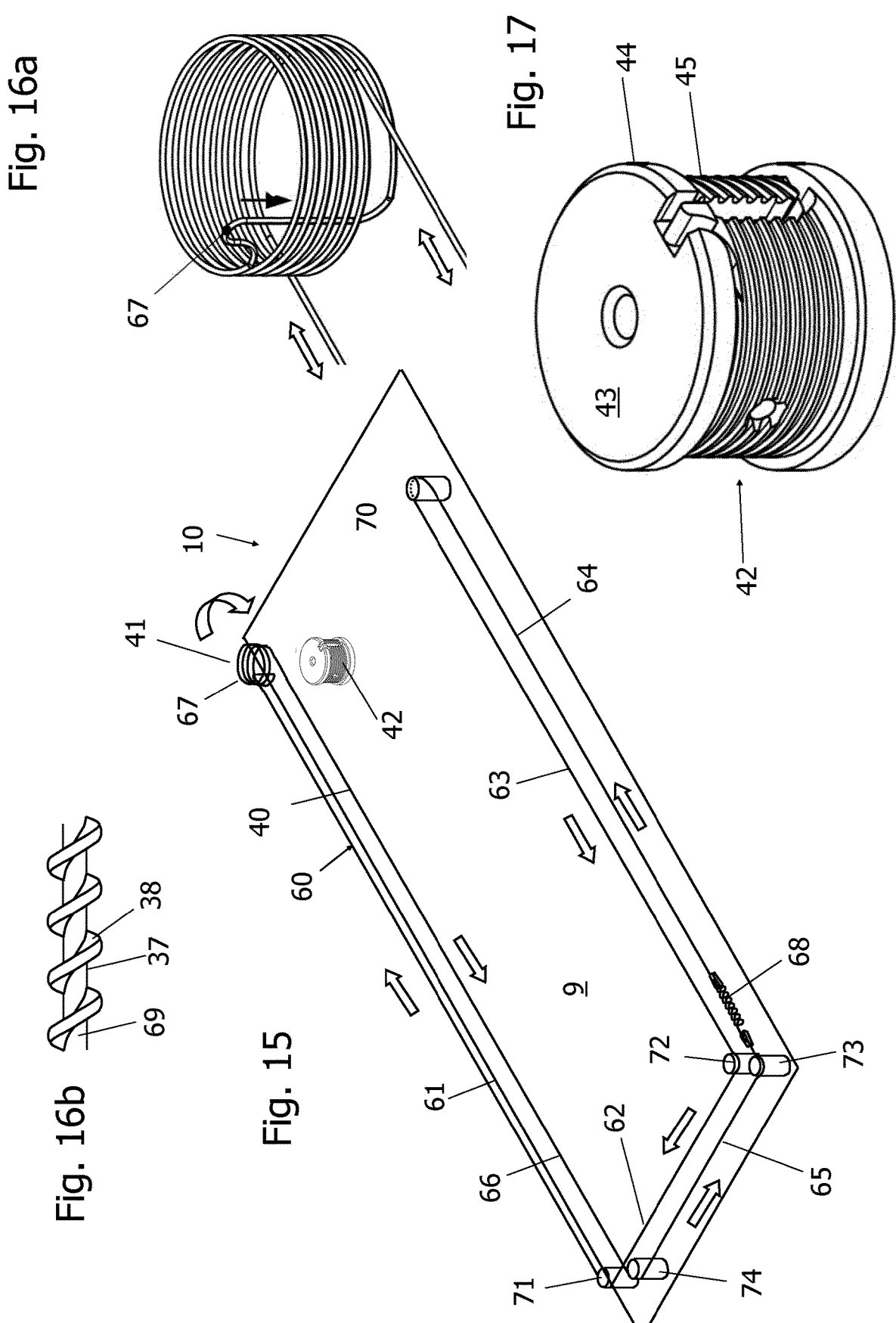

The raw material positioning unit 313 for the additive manufacturing device 300 for manufacturing a solid article comprises a raw material distribution unit 330, a guide unit 340 and a drive unit 341. The drive unit 341 is configured to move the raw material distribution unit 330 with respect to the guide unit 340. The raw material positioning unit 313 comprises a switch 350 for directing the raw material distribution unit 330 alternatively onto a first path 351 or a second path 352. The second path 352 is located below the first path 351. According to the embodiment of FIG. 12b, the guide unit 340 comprises a cable. The raw material distribution unit 330 is attached to the cable to be moveable therewith. The drive unit 341 is configured to move the cable, the drive unit may include a drive element. The drive element may include a rotary cable guide element, which is configured to perform a rotary movement if coupled to an engine. The cable may be coupled to the rotary cable guide element by friction, by a clamp mechanism or by a plurality of windings. An exemplary embodiment of a cable guide element is depicted in FIG. 15. The raw material distribution unit 330 performs an oscillating movement, thus the rotary engine of the rotary cable guide element is configured to change its direction of rotation. In particular, the cable forms a closed loop as shown in FIG. 12a or FIG. 12c. In addition to the rotary cable guide element, which is actuatable by the rotary engine, a plurality of rotatable cable guide elements is provided to create a closed loop in a U shape. According to the embodiment shown in FIG. 12a or FIG. 12c five rotatable cable guide elements and a rotary cable guide element are shown.

The switch 350 may include a flexible raw material distribution unit support portion 354. An actuation unit 353 may be provided for switching the flexible raw material distribution unit support portion 354 between the first path 351 and the second path 352. The actuation unit 353 may be connected to the raw material distribution unit 330 as shown in FIG. 13a.

Figures 13A, 13B, 13C, 13D:
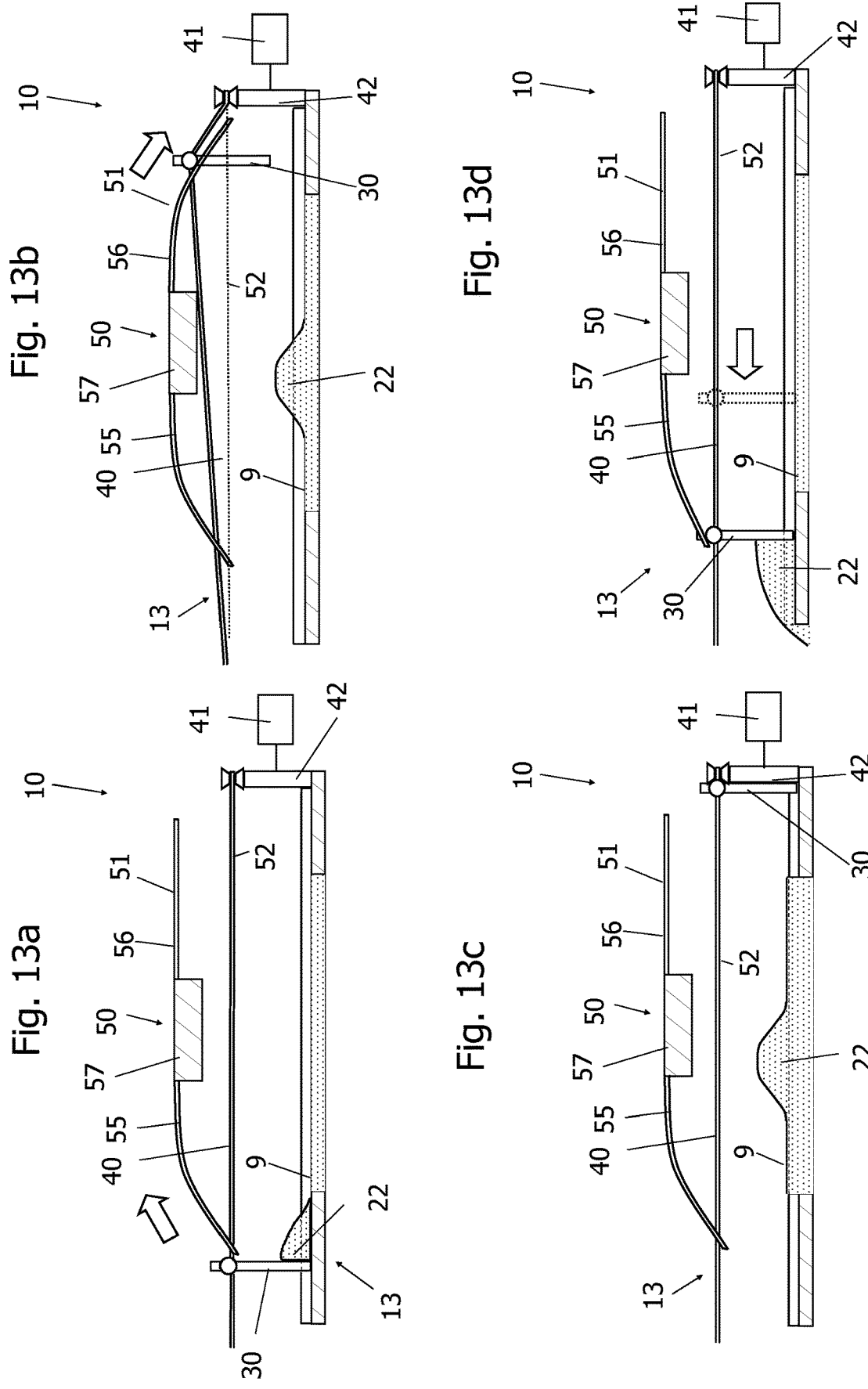

FIG. 13a shows a detail of a raw material processing unit 10 according to any of the previous embodiments of the invention showing a first phase of a raw material supply step. The reference numbers corresponding to the first embodiment have been used for elements having the same function as in the first embodiment. The detail shown in FIG. 13a to FIG. 13d is however also applicable to any of the other previously described embodiments. In particular, the configuration of the raw material positioning unit 13 can be applied to any of the previous embodiments. The raw material positioning unit 13 according to FIG. 13a comprises a raw material distribution unit 30, a guide unit 40 and a switch 50 configured to direct the raw material distribution unit 30 over a first path 51 or a second path 52. The raw material distribution unit 30 is according to this embodiment attached to the guide unit 40. The raw material distribution unit 30 is according to this embodiment configured as a sliding element. The raw material distribution unit 30 can be a plate-shaped element, which is attached on its two opposing lateral sides to the guide unit 40. The guide unit 40 is according to this embodiment configured as a cable which can include a wire or a rope, in particular a wire rope. The raw material distribution unit 30 is thus attached to the cable to be movable therewith. The cable can be arranged in a closed loop configuration as shown in FIG. 12a or 12c or FIG. 15. The cable can be moved by the drive unit 41. The drive unit 41 can be configured to rotate a drive element 42 which is configured to move the cable.

The switch 50 is configured to direct the raw material distribution unit 30 along a first path 51 or a second path 52. When the raw material distribution unit 30 is guided along the first path 51 the distance between the raw material distribution unit 30 and the raw material processing unit surface 9 is increased. The switch 50 comprises according to this embodiment a first guide element 55 and a second guide element 56. The first guide element 55 is of a curved shape, the second guide element 56 is straight. The first and second guide elements 55, 56 can contain a flexible portion, so that they can change their shape. A change of shape can be caused by the weight of the raw material distribution unit 30 or by a pressure force acting on the flexible portion which can be pushed away. The first and second guide elements 55, 56 are attached to a support element 57. The support element 57 rests on the raw material processing unit surface 9 and can be attached thereto. The attachment of the support element 57 is not shown in FIG. 13a.

The raw material distribution unit 30 is directed by the first guide element 55 onto the first path 51. Thereby, the raw material distribution unit 30 is lifted and any raw material which has been pushed forward by the raw material distribution unit 30 is deposited on the raw material processing unit surface 9. The raw material processing unit surface 9 is in this embodiment a raw material surface, e.g., of a first or second raw material container 14, 19 or a surface 109, 209, 309 as disclosed in any of the other embodiments. The raw material distribution unit 30 travels further along the first path 51 in the direction of the arrow in FIG. 13a. The raw material distribution unit 30 passes the support element and the second guide element 56. The second guide element 56 is lowered under the weight of the raw material distribution unit 30 and/or the force generated by the additional tension to which the cable is subjected when the raw material distribution unit 30 is forced to travel along the first path 51. In this exemplary example, the second guide element 56 can assume substantially the same shape as the first guide element 55. FIG. 13b shows the raw material distribution unit 30 in a position on the first path 51. At the end of the second guide element 56 the raw material distribution unit 30 is substantially at the same level as in FIG. 13a. This position of the raw material distribution unit 30 is shown in FIG. 13c.

FIG. 13b shows a detail of the raw material processing unit 13 according to any embodiment of the invention showing a second phase of a raw material supply step, in which the raw material distribution unit 30 passes along the first path 51 over the second guide element 56 which bends under the load of the raw material distribution unit 30 and/or the additional tension exerted on the guide unit 40, which is configured as a cable. In FIG. 13b a deposit of raw material 22 is shown under the switch 50.

FIG. 13c shows a detail of the raw material processing unit 13 according to any embodiment of the invention showing a third phase of a raw material supply step. The raw material distribution unit 30 is in a stop position just before returning to its initial position, which is in the drawing on the left side. The left-hand end position of the raw material distribution unit 30 is not visible in any of FIGS. 13a to 13d. In FIG. 1, 6, 9 examples of a raw material distribution unit 30 in a left-hand end position are shown. In FIG. 13c, the raw material distribution unit is thus positioned in the right-hand end position. The terms "left-hand position" and "right-hand position" are only used to indicate the respective positions in the schematic drawings. These terms need not necessarily correspond to the positions of any raw material distribution unit 30 of the raw material positioning unit 13 of a raw material processing unit 10 for an additive manufacturing device according to any one of the embodiments of the invention.

The second guide element 56 has returned into the same position as in FIG. 13a. The second guide element 56 may contain an elastic element or a shape memory alloy allowing it to assume its original position, as shown in FIG. 13a. The rotary movement of the drive unit 41 changes the direction of rotation, therefore the raw material distribution unit 30 is moved in the opposite direction with respect to FIG. 13b.

FIG. 13d shows a detail of the raw material processing unit 10 according to any embodiment of the invention showing a fourth phase of a raw material supply step. When the raw material distribution unit 30 moves backwards, as shown also in FIG. 13d, it does not come into contact with the second guide element 56. Therefore, the raw material distribution unit 30 can continue along the second path 52, which in this embodiment corresponds to the guide unit 40. The raw material distribution unit transports the deposited raw material 22 back to the build unit (not shown) for initiating another additive manufacturing step.

An additional switch may be provided on the opposite side of the raw material processing unit 13. An exemplary embodiment including such an additional switch is shown in FIG. 9.

Figures 14A, 14B, 14C, 14D:
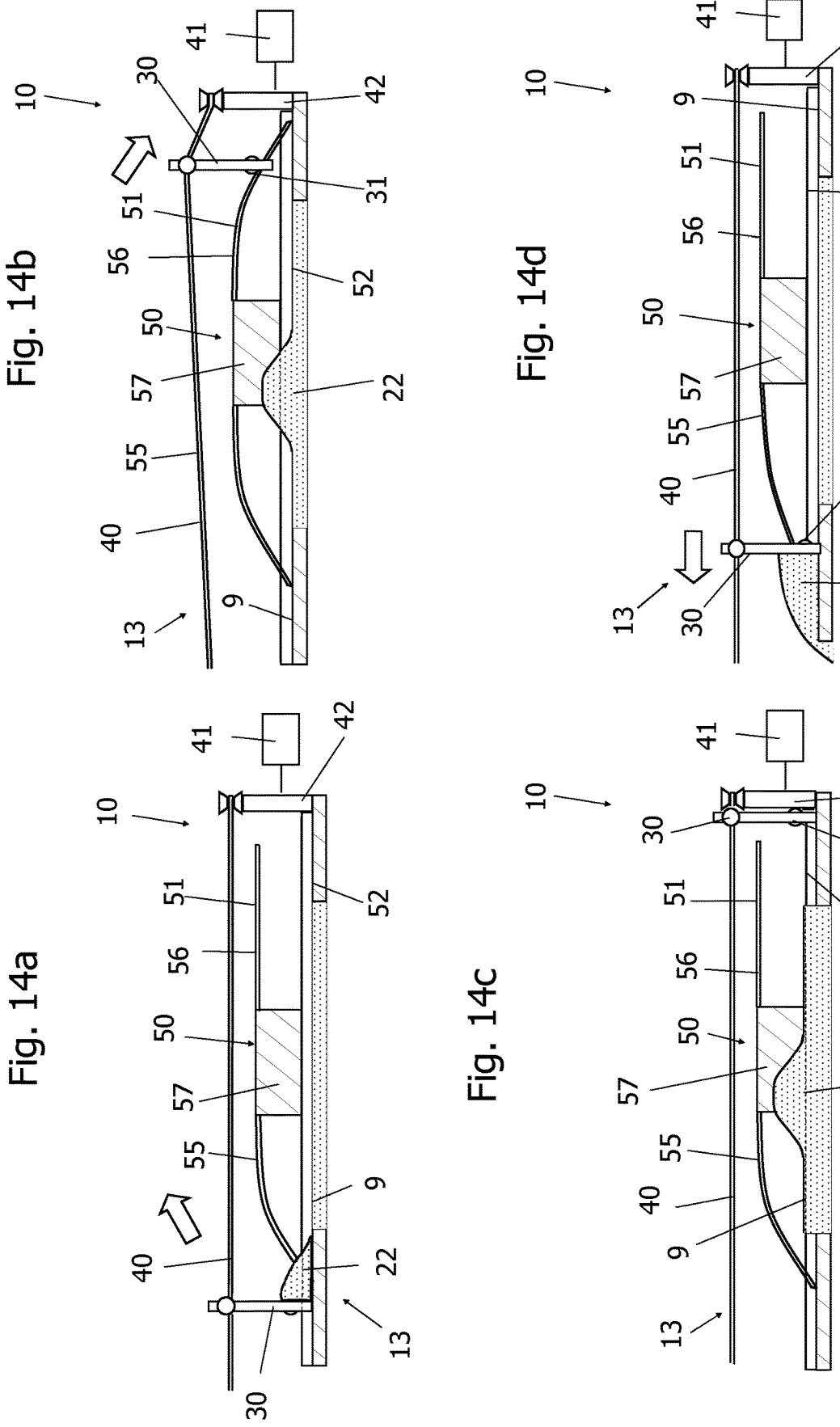

FIG. 14a shows a detail of a variant of a raw material processing unit 10 according to any of the previous embodiments of the invention showing a first phase of a raw material supply step corresponding to a fifth embodiment. The reference numbers corresponding to the first embodiment have been used for elements having the same function as in the first embodiment. The detail shown in FIG. 14a to FIG. 14d is however also applicable to any of the other previously described embodiments. In particular, the configuration of the raw material positioning unit 13 can be applied to any of the previous embodiments. The raw material positioning unit 13 according to FIG. 14a comprises a raw material distribution unit 30, a guide unit 40 and a switch 50 configured to direct the raw material distribution unit 30 over a first path 51 or a second path 52. The raw material distribution unit 30 is according to this embodiment attached to the guide unit 40. The raw material distribution unit 30 is according to this embodiment configured as a sliding element. The raw material distribution unit 30 can be a plate-shaped element, which is attached on its two opposing lateral sides to the guide unit 40. The guide unit 40 is according to this embodiment configured as a cable which can include a wire or a rope, in particular a wire rope. The raw material distribution unit 30 is thus attached to the cable to be movable therewith. The cable can be arranged in a closed loop configuration as shown in FIG. 12a or 12c or FIG. 15. The cable can be moved by the drive unit 41. The drive unit 41 can be configured to rotate a drive element 42 which is configured to move the cable.

The switch 50 is configured to direct the raw material distribution unit 30 along a first path 51 or a second path 52. When the raw material distribution unit 30 is guided along the first path 51 the distance between the raw material distribution unit 30 and the raw material processing unit surface 9 is increased. The switch 50 comprises according to this embodiment a first guide element 55 and a second guide element 56. The first guide element 55 is of a curved shape, the second guide element 56 is straight. The first and second guide elements 55, 56 can contain a flexible portion, so that they can change their shape. A change of shape can be caused by the weight of the raw material distribution unit 30 or by a pressure force acting on the flexible portion such that the flexible portion can be pushed away. The first and second guide elements 55, 56 are attached to a support element 57. The support element 57 rests on the raw material processing unit surface 9 and can be attached thereto.

The raw material distribution unit 30 is provided with an engagement element 31 which is configured to be in contact with counter-element forming the respective first or second path 51, 52. According to an embodiment, the engagement element 31 can be configured as a pin. The engagement element 31 can form a protrusion which performs a sliding movement along the first and second guide elements 55, 56 when the raw material distribution unit 30 is directed to travel via the first path 51. The engagement element 31 can perform a sliding movement along the raw material processing unit surface 9 or a rail element mounted on the raw material processing unit surface 9 when the raw material distribution unit 30 is directed to travel via the second path 52.

The raw material distribution unit 30 is directed by the first guide element 55 onto the first path 51. Thereby, the raw material distribution unit 30 is lifted and any raw material which has been pushed forward by the raw material distribution unit 30 is deposited on the raw material processing unit surface 9. The raw material processing unit surface 9 corresponds in this embodiment a raw material surface, of a first or second raw material container 14, 19 or a raw material processing unit surface 109, 209, 309 as disclosed in any of the other embodiments. The raw material distribution unit 30 travels further along the first path 51 in the direction of the arrow in FIG. 14a. The raw material distribution unit 30 passes the support element 57 and the second guide element 56. The second guide element 56 is lowered under the weight of the raw material distribution unit 30 and/or the force generated by the additional tension to which the cable is subjected when the raw material distribution unit 30 is forced to travel along the first path 51. In this exemplary example, the second guide element 56 can assume substantially the same shape as the first guide element 55. FIG. 14b shows the raw material distribution unit 30 in a position on the first path 51. At the end of the second guide element 56, the raw material distribution unit 30 is substantially at the same level as in FIG. 14a. This position of the raw material distribution unit 30 is shown in FIG. 14c.

FIG. 14b shows a detail of the raw material processing unit 13 according to the fifth embodiment of the invention showing a second phase of a raw material supply step, in which the raw material distribution unit 30 passes along the first path 51 over the second guide element 56 which bends under the load of the raw material distribution unit 30 and/or the additional tension exerted on the guide unit 40, which is configured as a cable. In FIG. 14*b* a deposit of raw material 22 is shown in the region of the switch 50.

FIG. 14*c* shows a detail of the raw material processing unit 13 according to the fifth embodiment of the invention showing a third phase of a raw material supply step. The raw material distribution unit 30 is in a stop position just before returning to its initial position, which is in the drawing on the left side. The left-hand end position of the raw material distribution unit 30 is not visible in any of FIGS. 14*a* to 14*d*. In FIG. 1, 6, 9 examples of a raw material distribution unit 30 in a left-hand end position are shown. In FIG. 14*c*, the raw material distribution unit 30 is thus positioned in the right-hand end position. The terms "left-hand position" and "right-hand position" are only used to indicate the respective positions in the schematic drawings. These terms need not necessarily correspond to the positions of any raw material distribution unit 30 of the raw material positioning unit 13 of a raw material processing unit 10 for an additive manufacturing device 1 according to any one of the embodiments of the invention.

The second guide element 56 has returned into the same position as in FIG. 14*a*. The second guide element 56 may contain an elastic element or a shape memory alloy allowing it to assume its original position, as shown in FIG. 14*a*. The rotary movement of the drive unit 41 changes the direction of rotation, therefore the raw material distribution unit 30 is moved in the opposite direction with respect to FIG. 14*b*.

FIG. 14*d* shows a detail of the raw material processing unit 10 according to the fifth embodiment of the invention showing a fourth phase of a raw material supply step. When the raw material distribution unit 30 moves backwards, as shown also in FIG. 14*d*, it does not come into contact with the second guide element 56. Therefore, the raw material distribution unit 30 can continue along the second path 52, which in this embodiment corresponds to the guide unit 40. The raw material distribution unit 30 transports the deposited raw material 22 back to the build unit (not shown) for initiating another additive manufacturing step.

An additional switch may be provided on the opposite side of the raw material processing unit 10. An exemplary embodiment including such an additional switch is shown in FIG. 9.

FIG. 15 is a view of an exemplary embodiment of a guide unit 40. As shown in some of the previous embodiments, the guide unit 40 comprises a cable. The cable is configured as a closed cable loop 60. According to this embodiment, the closed cable loop 60 extends over three sides of the raw material processing unit 10. The raw material processing unit is shown only schematically as a rectangular raw material processing unit surface 9 in a perspective view. The closed cable loop 60 comprises a plurality of cable segments. According to this embodiment, the cable loop 60 comprises a first cable segment 61, a second cable segment 62, a third cable segment 63, a fourth cable segment 64, a fifth cable segment 65, a sixth cable segment 66 and a seventh cable segment 67.

The first cable segment 61 extends parallel to the third cable segment 63, to the fourth cable segment 64 and to the sixth cable segment 66. The second cable segment 62 extends parallel to the fifth cable segment 65. The second cable segment 62 and the fifth cable segments are arranged substantially perpendicular to the first, third, fourth and sixth cable segments 61, 63, 64, 66.

The seventh cable segment 67 is receivable in drive element 42. The drive element 42 and the seventh cable segment 67 are shown in explosive view. The drive element 42 according to this embodiment is configured as a cable drum 43 as shown in detail in FIG. 17.

FIG. 16*a* shows a detail of a fixation of the seventh cable segment 67 of the cable loop 60 of FIG. 15. The seventh cable segment 67 comprises a plurality of windings which are received in the corresponding grooves 45 of the cable drum 43 as shown in FIG. 17. The windings allow to increase the friction between the grooves and the seventh cable segment 67. Slipping of the seventh cable segment 67 in the associated grooves 45 is thereby prevented according to this exemplary embodiment.

The seventh cable segment 67 and the associated first to sixth cable segments 61, 62, 63, 64, 65, 66 are set in a rotational movement via a drive of the cable drum not shown in FIG. 15. This results in a translational movement of the first to sixth cable segments. According to the clockwise direction of rotation shown in FIG. 15, the first cable segment 61, the second cable segment 62 and the third cable segment 63 perform a translational movement in the direction of the cable drum 43. At the same time, a translational movement of the fourth, fifth and sixth cable segments 64, 65, 66 away from the cable drum 43 takes place. The third cable segment 63 and the fourth cable segment 44 are guided around a deflection element 70. As a result, the translational movement of the third cable segment 63 takes place in the opposite direction with respect to the translational movement of the fourth cable segment 64. The deflection element 70 is designed in such a way to provide a wrap angle of approximately 180 degrees.

According to the present exemplary embodiment, the guide unit 40 comprises a first partial deflection element 71, a second partial deflection element 72, a third partial deflection element 73 and a fourth partial deflection element 74. The partial deflection element differs from the deflection element in that the wrap angle of the partial deflection element is less than 180 degrees. According to the present exemplary embodiment, the first, second, third and fourth partial deflection elements 71, 72, 73, 74 each form a wrap angle of approximately 90 degrees.

By reversing the direction of rotation of the drive unit 41 the direction of the translational movement of the respective first, second, third fourth, fifth and sixth cable segments 61, 62, 63, 64, 65, 66 is reversed. A raw material distribution unit can be attached either to the first and fourth cable segments 61, 64 to be movable therewith or to the third and sixth cable segments 63, 66 to be movable therewith. A cable segment can contain a deformable compensation element 68. The deformable compensation element 68 is useful to adjust the tension on the guide unit 40.

FIG. 16*b* shows an enlarged section of a cable 69 according to a variant which can be used for a cable loop 60 as disclosed in FIG. 15. The cable 69 is provided with a spiral-shaped profile. According to an embodiment, the spiral shaped profile can be obtained by a second cable 38 which is wound spirally around a first cable 37. The spiral shaped profile can engage with a cable drum with a corresponding profile or a gear element which is configured to be rotated by a drive unit 40. A cable with a spiral-shaped profile can be used advantageously to prevent any sliding of the cable in case of insufficient friction.

FIG. 17 shows an exemplary embodiment of a cable drum 43. The cable drum 43 is an exemplary embodiment of a drive element 42. The cable drum 43 comprises a body 44, which is of a substantially cylindrical shape. A plurality of grooves 45 is provided on the outer circumference of the body 44. According to this embodiment, a plurality of radial grooves is provided and an axial groove which extends at least from the uppermost to the lowermost radial groove. The radial grooves may be arranged in a helical arrangement for receiving the seventh cable segment 67.

Figures 18A, 18B, 18C, 18D, 18E:
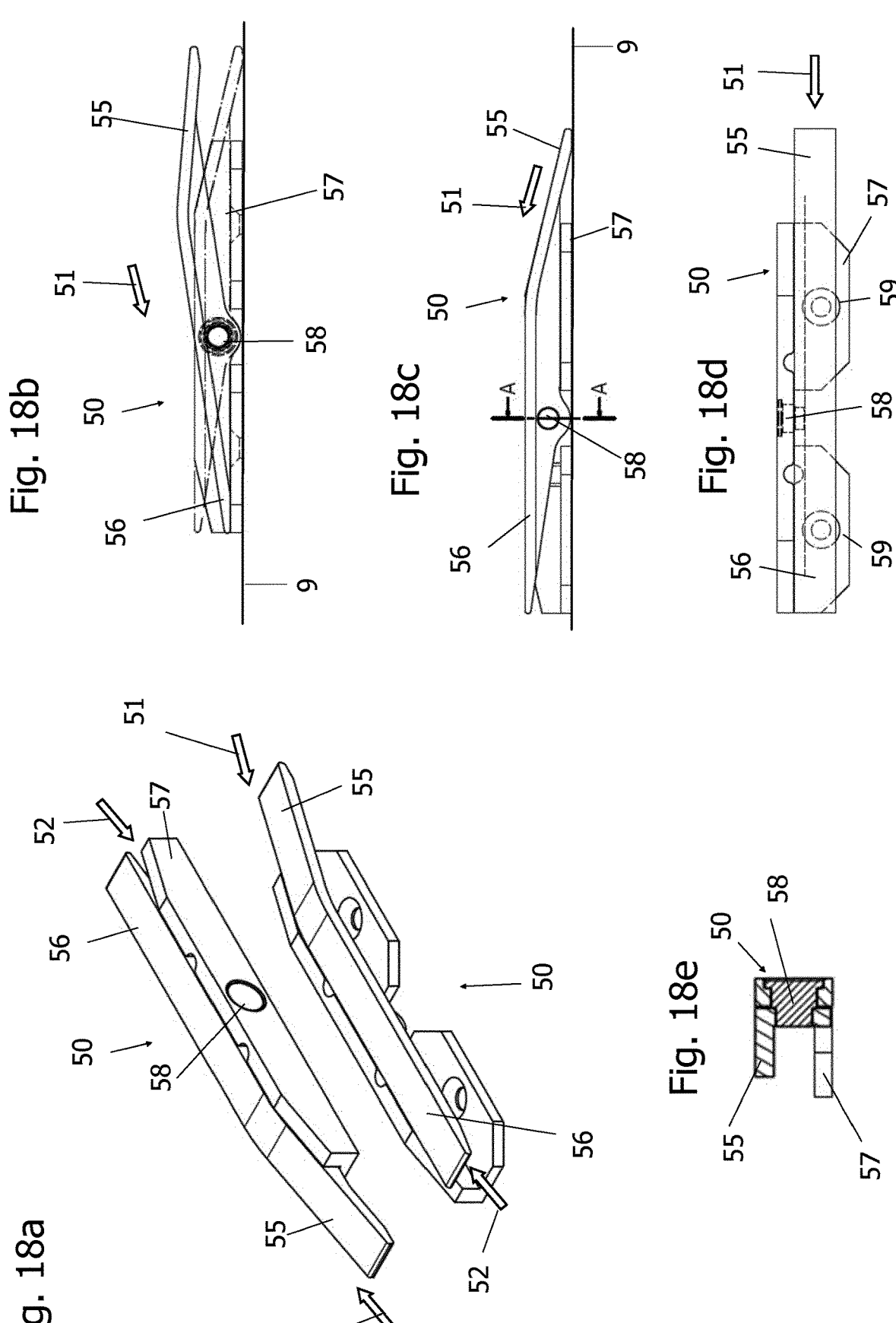
FIG. 18*e* is a sectional view taken along the section A-A of FIG. 18*c*.

FIG. 18a shows a detail of an embodiment of a switch 50 for a raw material processing unit 10 according to any of the previous embodiments. The reference numbers corresponding to the first embodiment have been used for elements having the same function as in the first embodiment. The switch shown in FIG. 18a to FIG. 18e can be used for any of the other previously described embodiments. In particular, the switch 50 can be used in a configuration of the raw material positioning unit 13 as shown in FIG. 14a to FIG. 14d. The switch 50 is configured to direct the raw material distribution unit 30, which is not shown, over a first path 51 or a second path 52, which are both marked by arrows. FIG. 18a actually shows two possible mounting positions for the switch 50, thus FIG. 18a shows two switches 50 of the same configuration in two alternative mounting positions.

The raw material distribution unit 30 is according to this embodiment attached to the guide unit 40, please refer to FIG. 13a to FIG. 13d or to FIG. 14a to FIG. 14d. The raw material distribution unit 30 is according to this embodiment configured as a sliding element. The raw material distribution unit 30 can be a plate-shaped element, which is attached on its two opposing lateral sides to the guide unit 40. The guide unit 40 is according to this embodiment configured as a cable which can include a wire or a rope, in particular a wire rope. The raw material distribution unit 30 is thus attached to the cable to be movable therewith. The cable can be arranged in a closed loop configuration as shown in FIG. 12a or 12c or FIG. 15. The cable can be moved by the drive unit 41. The drive unit 41 can be configured to rotate a drive element 42 which is configured to move the cable.

The switch 50 is configured to direct the raw material distribution unit 30 along a first path 51 or a second path 52. When the raw material distribution unit 30 is guided along the first path 51 the distance between the raw material distribution unit 30 and the raw material processing unit surface 9 is increased. The switch 50 comprises according to this embodiment a first guide element 55 and a second guide element 56. The first guide element 55 is of a curved shape, the second guide element 56 is straight. The first and second guide elements 55, 56 are attached to a support element 57. The support element 57 rests on the raw material processing unit surface 9 and can be attached thereto or is formed a part of the raw material processing unit 10. The first and second guide elements 55, 56 are pivotable about a joint 58 mounted in the support element 57, so that they can change their position with respect to the raw material processing unit surface 9 as shown in FIG. 18b. A change of position can be caused by the weight of the raw material distribution unit 30 passing over the first or second guide element 55, 56 or by an engagement element attached to the raw material distribution unit 30 which is configured to lift the first or second guide element 55, 56. The joint 58 is configured to be rotatable in a corresponding bore of the support element 57.

As shown in FIG. 14a to FIG. 14d the raw material distribution unit 30 is provided with the engagement element 31 which is configured to be in contact with the switch 50 which is configured as an embodiment of a counter-element forming the respective first or second path 51, 52. According to an embodiment, the engagement element 31 can be configured as a pin. The engagement element 31 can form a protrusion which performs a sliding movement on top of the first and second guide elements 55, 56 when the raw material distribution unit 30 is directed to travel via the first path 51. The engagement element 31 can perform a sliding movement along the raw material processing unit surface 9 or a rail element mounted on the raw material processing unit surface 9 when the raw material distribution unit 30 is directed to travel via the second path 52.

The raw material distribution unit 30 is directed by the first guide element 55 onto the first path 51. Thereby, the raw material distribution unit 30 is lifted and any raw material which has been pushed forward by the raw material distribution unit 30 is deposited on the raw material processing unit surface 9. The raw material processing unit surface 9 is in this embodiment a raw material surface, e.g., of a first or second raw material container 14, 19 or a raw material processing unit surface 109, 209, 309 as disclosed in any of the other embodiments. The raw material distribution unit 30 travels further along the first path 51 in the direction of the arrow in FIG. 14a or FIG. 18a. The raw material distribution unit 30 passes the support element 57 and the second guide element 56. The second guide element 56 is lowered under the weight of the raw material distribution unit 30 and/or the force generated by the additional tension to which the cable is subjected when the raw material distribution unit 30 is forced to travel along the first path 51. This position is shown in FIG. 18b. The position of the first and second guide element 55, 56 for the raw material distribution unit 30 traveling along the second path 52 is shown in dash-dotted lines. In this exemplary example, the second guide element 56 has a different shape as compared to the first guide element 55. In particular the second guide element can consist of a straight section only. The first guide element can include a first straight section and a second straight section and a curved section which forms the transition between the first straight section and the second straight section.

FIG. 18b shows the switch in a position when the raw material distribution unit 30 travels along the first path 51 over the second guide element 56. At the end of the second guide element 56, the raw material distribution unit 30 is substantially at the same level as before its arrival at the switch, therefore this level position can be referred to as the base level position. The base level position of the raw material distribution unit 30 is shown in FIG. 14a or FIG. 14c.

FIG. 18c is a side view of the switch 50 and shows the switch 50 in a position when the raw material distribution unit 30 travels along the first path 51 over the first guide element 55. At the end of the first guide element 55, the switching action takes place, thus the second guide element 56 pivots towards the raw material processing unit surface 9. The raw material distribution unit 30 descends towards the raw material processing unit 9 when guided over the second guide element 56 and reaches the base level position at the end of the second guide element 56.

FIG. 18d is a top view of the switch 50 showing the first and second guide elements 55, 56 on the support element 57. The support element 57 comprises two bores for attachment to a raw material processing unit by screw elements, e.g., one of the raw material processing units as disclosed in the previously described embodiments.

FIG. 18e is a sectional view taken along the section A-A of the switch 50 FIG. 18c which is somewhat enlarged to show the joint 58, which is received in the support element 57 and carries the first and second guide elements 55, 56.

The switch as shown in any of FIG. 18a to FIG. 18e is particularly robust. The switch does not contain flexible parts or spring elements, therefore a switch according to this embodiment is considerably less subject to wear and therefore the lifetime is increased before a replacement thereof is required.

FIG. 19a shows a detail of a further embodiment of a switch 50 for a raw material processing unit 10 according to any of the previous embodiments. The reference numbers corresponding to the first embodiment have been used for elements having the same function as in the first embodiment. The switch shown in FIG. 19a to FIG. 19e can also be used for any of the other previously described embodiments. In particular, the switch 50 can be used in a configuration of the raw material positioning unit 13 as shown in FIG. 14a to FIG. 14d. The switch 50 is configured to direct the raw material distribution unit 30, which is not shown, over a first path 51 or a second path 52, which are both marked by arrows. FIG. 19a actually shows two possible mounting positions for the switch 50, thus FIG. 19a shows two switches 50 of the same configuration in two alternative mounting positions.

The raw material distribution unit 30 is according to this embodiment attached to the guide unit 40, please refer to FIG. 13a to FIG. 13d or to FIG. 14a to FIG. 14d. The raw material distribution unit 30 is according to this embodiment configured as a sliding element. The raw material distribution unit 30 can be a plate-shaped element, which is attached on its two opposing lateral sides to the guide unit 40. The guide unit 40 is according to this embodiment configured as a cable which can include a wire or a rope, in particular a wire rope. The raw material distribution unit 30 is thus attached to the cable to be movable therewith. The cable can be arranged in a closed loop configuration as shown in FIG. 12a or 12c or FIG. 15. The cable can be moved by the drive unit 41. The drive unit 41 can be configured to rotate a drive element 42 which is configured to move the cable.

The switch 50 is configured to direct the raw material distribution unit 30 along a first path 51 or a second path 52. When the raw material distribution unit 30 is guided along the first path 51 the distance between the raw material distribution unit 30 and the raw material processing unit surface 9 is increased. The switch 50 comprises according to this embodiment a first guide element 55 and a second guide element 56. The first guide element 55 is of a curved shape. According to the embodiment shown in FIG. 19a to FIG. 19e the second guide element 56 is configured as a surface of a support element 57. The second guide element 56 is also of a curved shape. The first guide element 55 is attached to the support element 57. The support element 57 rests on the raw material processing unit surface 9 and can be attached thereto or is formed a part of the raw material processing unit 10. The first guide element 55 is pivotable about a joint 58 mounted in the support element 57, so that it can change its position with respect to the raw material processing unit surface 9 as shown in FIG. 19b. The first guide element 55 can change its position with respect to the support element 57 as shown in FIG. 19a or FIG. 19b. A change of position can be caused by an engagement element attached to the raw material distribution unit 30 which is configured to lift the first guide element 55 when traveling along the second path 52. The joint 58 is configured to be rotatable in a corresponding bore of the support element 57.

As shown in FIG. 14a to FIG. 14d the raw material distribution unit 30 is provided with the engagement element 31 which is configured to be in contact with the switch 50 which is configured as an embodiment of a counter-element forming the respective first or second path 51, 52. According to an embodiment, the engagement element 31 can be configured as a pin. The engagement element 31 can form a protrusion which performs a sliding movement on top of the first and second guide elements 55, 56 when the raw material distribution unit 30 is directed to travel via the first path 51.

The engagement element 31 can perform a sliding movement over the second guide element 56 and further along the raw material processing unit surface 9 or a rail element mounted on the raw material processing unit surface 9 when the raw material distribution unit 30 is directed to travel via the second path 52.

The raw material distribution unit 30 is directed by the first guide element 55 onto the first path 51. Thereby, the raw material distribution unit 30 is lifted and any raw material which has been pushed forward by the raw material distribution unit 30 is deposited on the raw material processing unit surface 9. The raw material processing unit surface 9 is in this embodiment a raw material surface, e.g., of a first or second raw material container 14, 19 or a raw material processing unit surface 109, 209, 309 as disclosed in any of the other embodiments. The raw material distribution unit 30 travels further along the first path 51 in the direction of the arrow in FIG. 14a or FIG. 19a or FIG. 19c. The raw material distribution unit 30 passes the support element 57 and the second guide element 56. The position of the first and second guide elements 55, 56 for the raw material distribution unit 30 traveling along the second path 52 is shown in FIG. 19b and the position of the first and second guide elements 55, 56 for the raw material distribution unit 30 traveling along the first path 51 is shown in dash-dotted lines. In this exemplary example, the second guide element 56 has a different shape as compared to the first guide element 55. In particular the second guide element can comprise a straight section and a curved section. The first guide element 55 can include a first straight section and a second straight section and a curved section which forms the transition between the first straight section and the second straight section.

FIG. 19b shows the switch 50 in a position when the raw material distribution unit 30 travels along the second path 52 over the second guide element 56. When arriving at the end of the second guide element 56, the raw material distribution unit 30 is substantially at the same level as before its arrival at the switch 50, therefore this level position can be referred to as the base level position. The base level position of the raw material distribution unit 30 is shown in FIG. 14a or FIG. 14c.

FIG. 19c is a side view of the switch 50 and shows the switch 50 in a position when the raw material distribution unit 30 travels along the first path 51 over the first guide element 55. At the end of the first guide element 55, the switching action takes place as the direction of travel is reversed. A stop 46 can be provided at the end of the first guide element 55. The engagement element 31 of the raw material distribution unit 30 is directed to travel along the second guide element 56 towards the raw material processing unit surface 9. The raw material distribution unit 30 descends towards the raw material processing unit 9 when guided over the second guide element 56 and reaches the base level position at the end of the second guide element 56. The support element 57 comprises two bores 49 for attachment to a raw material processing unit 10 by screw elements, e.g., one of the raw material processing units as disclosed in the previously described embodiments. The bores 49 are represented by dashed lines as they are not visible in FIG. 19c.

FIG. 19d is a top view of the switch 50 showing the first and second guide elements 55, 56 on the support element 57.

FIG. 19e is a sectional view taken along the section A-A of the switch 50 FIG. 19c which is somewhat enlarged to show the joint 58, which is received in the support element 57 and carries the first guide element 55.

The switch 50 as shown in any of FIG. 19*a* to FIG. 19*e* is particularly robust. The switch does not contain flexible parts or spring elements, therefore a switch according to this embodiment is considerably less subject to wear and therefore the lifetime is increased before a replacement thereof is required. Furthermore, the switch 50 according to this configuration has a reduced overall length dimension, in particular its length is smaller than the length of the switch of FIG. 18*a* to FIG. 18*e*.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of an element or compound selected from the group consisting of A, B, C . . . and N, the text should be interpreted as requiring only one element from the group, not A plus N, or B plus N, etc.

The invention claimed is:

1. A method for supplying a flowable raw material to a raw material processing unit of an additive manufacturing device, wherein the raw material processing unit comprises a build unit, which comprises a recess in a raw material processing unit surface, and a raw material supply unit, wherein a raw material portion of the flowable raw material is supplied to the build unit by the raw material supply unit, wherein the raw material supply unit includes a raw material container unit and a raw material positioning unit, wherein the raw material positioning unit is configured to move the raw material portion from the raw material container unit to the build unit to form a raw material layer for the respective additive manufacturing step, wherein the raw material portion comprises a main raw material portion and a residual raw material portion, wherein the main raw material portion forms the raw material layer in the build unit and wherein the raw material positioning unit deposits the residual raw material portion on the raw material processing unit surface after supplying the main raw material portion to the build unit, wherein the raw material positioning unit comprises a raw material distribution unit, a guide unit and a drive unit, wherein the drive unit moves the raw material distribution unit along the guide unit to supply the main raw material portion to the build unit, wherein the raw material positioning unit comprises a switch for directing the raw material distribution unit onto a first path, whereby a distance between the surface and the raw material distribution unit is increased when it travels along the first path to deposit the residual raw material on the raw material processing unit surface to form a deposited residual raw material, wherein the direction of a movement of the raw material distribution unit is reversed after the deposit of the residual raw material is completed and the switch is actuated to direct the raw material distribution unit onto a second path to move the raw material distribution unit essentially parallel to the raw material processing unit surface, wherein the raw material distribution unit travels back along the second path thereby picking up the deposited residual raw material and distributing the residual raw material to the build unit.

2. The method of claim 1, wherein the flowable raw material in the raw material container unit is moved upwardly in a stepwise manner to provide the raw material portion.

3. The method of claim 1, wherein the build unit comprises a recipient including a movable recipient bottom, wherein the movable recipient bottom is lowered to provide a filling space for the main raw material portion.

4. The method of claim 3, wherein the main raw material portion is filled in the filling space by the raw material distribution unit.

5. The method of claim 1, wherein the raw material container unit comprises a first raw material container unit and a second raw material container unit.

6. The method of claim 1, wherein the raw material positioning unit is moved along the first path to deposit the residual raw material on the raw material processing unit surface and wherein the raw material positioning unit is moved along the second path to move the residual raw material portion and a further raw material portion on top of a previously deposited raw material layer in the build unit after an additive manufacturing step has been completed to form a portion of a solid article in a corresponding topmost raw material layer in the build unit.

7. An additive manufacturing device for manufacturing a solid article, wherein the additive manufacturing device comprises a flowable raw material and a raw material processing unit, wherein the raw material processing unit comprises a raw material container unit, a build unit and a raw material positioning unit, wherein the build unit comprises a recess in a raw material processing unit surface, wherein the raw material positioning unit comprises a raw material distribution unit, a guide unit and a drive unit, wherein the drive unit is configured to move the raw material distribution unit with respect to the guide unit to supply a main raw material portion to the build unit, wherein the raw material positioning unit comprises a switch for directing the raw material distribution unit in a first direction onto a first path, wherein the first path is configured such that a distance between the raw material processing unit surface and the raw material distribution unit is increased when the raw material distribution unit travels along the first path to deposit a residual raw material on the raw material processing unit surface, wherein the raw material positioning unit is configured to reverse a movement of the raw material distribution unit after completion of the deposit of the residual raw material on the raw material processing unit surface, wherein the switch is configured to be actuated to direct the raw material distribution unit onto a second path in a second direction opposite to the first direction, wherein the second path is arranged to move the raw material distribution unit parallel to the raw material processing unit surface, wherein the raw material positioning unit is configured to move the raw material distribution unit along the second path for picking up the deposited residual raw material and distributing the residual raw material to the build unit.

8. The additive manufacturing device of claim 7, wherein the guide unit comprises at least one of a guide rail or a cable.

9. The additive manufacturing device of claim 8, wherein the cable comprises a first cable and a second cable, wherein the second cable is wound around the first cable.

10. The additive manufacturing device of claim 7, wherein the switch comprises one of a hydraulically or pneumatically actuatable pressure cylinder or a support or the switch is electrically actuatable.

11. The additive manufacturing device of claim 7, wherein the guide unit is movable together with the raw material distribution unit.

12. The additive manufacturing device of claim 11, wherein the raw material distribution unit is attached to the guide unit.

13. The additive manufacturing device of claim 7, wherein the distance between the raw material distribution unit and the raw material processing unit surface is constant along the second path.

14. The additive manufacturing device of claim 7, wherein the guide unit is adjustable in its length.

15. The additive manufacturing device of claim 14, wherein the guide unit is elastically deformable or contains an elastically deformable compensation element.

16. The additive manufacturing device of claim 7, wherein the guide unit comprises a cable loop.

17. The additive manufacturing device of claim 16, wherein the cable loop comprises a plurality of cable segments.

18. The additive manufacturing device of claim 17, wherein one of the cable segments is attachable to the drive unit.

19. The additive manufacturing device of claim 7, wherein the drive unit is configured as a cable drum.

20. The additive manufacturing device of claim 7, wherein the switch is configured as a support element including a first guide element and a second guide element, wherein the second guide element is movable relative to the first guide element.

\* \* \* \* \*